US012786960B2

(12) United States Patent
Fouad et al.

(10) Patent No.: US 12,786,960 B2
(45) Date of Patent: Nov. 3, 2026

(54) SYSTEMS AND METHODS FOR BEAM PAIRING

(71) Applicant: Samsung Electronics Co., Ltd., Suwon-si (KR)

(72) Inventors: Yaser Mohamed Mostafa Kamal Fouad, San Diego, CA (US); Philippe Jean Marc Michel Sartori, Naperville, IL (US); Liang Hu, San Diego, CA (US); Mohamed Mokhtar Gaber Moursi Awadin, San Diego, CA (US); Jung Hyun Bae, San Diego, CA (US); Yuhan Zhou, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 18/363,729

(22) Filed: Aug. 1, 2023

(65) Prior Publication Data

US 2024/0057043 A1 Feb. 15, 2024

Related U.S. Application Data

(60) Provisional application No. 63/397,486, filed on Aug. 12, 2022.

(51) Int. Cl.
*H04W 72/044* (2023.01)
*H04W 72/30* (2023.01)

(52) U.S. Cl.
CPC ......... *H04W 72/044* (2013.01); *H04W 72/30* (2023.01)

(58) Field of Classification Search
CPC ............... H04W 72/044; H04W 72/04; H04W 72/0457; H04W 72/40; H04W 72/11;
(Continued)

(56) References Cited

U.S. PATENT DOCUMENTS

2021/0045103 A1 2/2021 Kim et al.
2021/0168574 A1 6/2021 Zhang et al.
2021/0321267 A1 10/2021 Kim
2023/0115882 A1 * 4/2023 Keshavamurthy .... H04W 72/25 370/350

(Continued)

FOREIGN PATENT DOCUMENTS

CN 110637488 A * 12/2019 ........ H04W 56/0015
EP 3843491 A1 * 6/2021 ............ H04W 92/18

(Continued)

OTHER PUBLICATIONS

Chen, W. et al., "5G-Advanced Towards 6G: Past, Present, and Future", arXiv:2303.07456v1, Mar. 13, 2023, pp. 1-28.
Harounabadi, M. et al., "V2X in 3GPP Standardization: NR Sidelink in Release-16 and Beyond", IEEE Communications Standards Magazine, Mar. 2021, pp. 12-21, IEEE.

(Continued)

*Primary Examiner* — Phong La
(74) *Attorney, Agent, or Firm* — Womble Bond Dickinson (US) LLP

(57) ABSTRACT

A system and a method are disclosed for beam pairing. In some embodiments, the method includes: accessing, by a first User Equipment (UE), configuration data indicating a slot structure including a plurality of resources for transmissions in different directions; and based on the configuration data, transmitting, by the first UE, in a single slot, a first transmission portion using a first resource of the plurality of resources with a first beam direction and a second transmission portion using a second resource of the plurality of resources with a second beam direction, different from the first beam direction.

20 Claims, 15 Drawing Sheets

(58) Field of Classification Search
CPC .... H04W 72/115; H04L 5/0023; H04L 5/005; H04L 5/0053; H04L 5/0094; H04B 7/0696; H04B 7/06954
See application file for complete search history.

(56) References Cited

U.S. PATENT DOCUMENTS

| | | | | |
|---|---|---|---|---|
| 2023/0209365 | A1 | 6/2023 | Fouad et al. | |
| 2023/0354271 | A1 * | 11/2023 | Zeng | H04W 72/02 |

FOREIGN PATENT DOCUMENTS

| | | | | |
|---|---|---|---|---|
| EP | 3927011 | A1 * | 12/2021 | H04W 72/20 |
| WO | WO-2020066696 | A1 * | 4/2020 | H04W 4/40 |
| WO | WO-2021029076 | A1 * | 2/2021 | H04W 56/00 |
| WO | WO 2021/225413 | A1 | 11/2021 | |

OTHER PUBLICATIONS

3rd Generation Partnership Project, "Technical Specification Group Radio Access Network; NR; Physical layer procedures for control", Jun. 23, 2022, 3GPP TS 38.213, V16.10.0, Release 16, pp. 1-190.
3rd Generation Partnership Project, "Technical Specification Group Radio Access Network; Study on New Radio Access Technology Physical Layer Aspects", Sep. 26, 2017, 3GPP TR 38.802, V14.2.0, Release 14, pp. 1-146.
3rd Generation Partnership Project, "Technical Specification Group Radio Access Network; NR; Physical layer procedures for data", Jun. 23, 2022, 3GPP TS 38.214, V17.2.0, Release 17, pp. 1-229.

* cited by examiner

SYSTEMS AND METHODS FOR BEAM PAIRING

CROSS-REFERENCE TO RELATED APPLICATION

This application claims the priority benefit under 35 U.S.C. § 119(e) of U.S. Provisional Application No. 63/397,486, filed on Aug. 12, 2022, the disclosure of which is incorporated by reference in its entirety as if fully set forth herein.

TECHNICAL FIELD

The disclosure generally relates to wireless communications. More particularly, the subject matter disclosed herein relates to improvements to systems and methods for beam pairing in a wireless communications system.

SUMMARY

Requirements on wireless systems continue to evolve as the number of user devices increases. Availability of radio spectrum is a constraint that in some circumstances limits wireless communications.

To solve this problem higher radio frequencies, such as Frequency Range 2 (FR2) are being employed.

One issue with the above approach is that path loss may be high at such frequencies.

To overcome these issues, systems and methods are described herein for managing the use of directional antennas by user devices (or User Equipments (UEs)). Such directional antennas may have antenna gain that is significantly higher than that of an omnidirectional antenna.

The above approaches improve on previous methods because they enable the use of FR2 by UEs.

According to an embodiment of the present disclosure, there is provided a method, including: accessing, by a first User Equipment (UE), configuration data indicating a slot structure including a plurality of resources for transmissions in different directions; and based on the configuration data, transmitting, by the first UE, in a single slot, a first transmission portion using a first resource of the plurality of resources with a first beam direction and a second transmission portion using a second resource of the plurality of resources with a second beam direction, different from the first beam direction.

In some embodiments, the first transmission portion is a portion of a Synchronization Signal Block (SSB), and the second transmission portion is a portion of a same SSB.

In some embodiments, the first transmission portion is a portion of a Synchronization Signal Block—like (SSB-like) transmission, and the second transmission portion is a portion of a same SSB-like transmission.

In some embodiments, the first transmission portion is transmitted in resources from a resource pool that is (pre)-configured by RRC, the resource pool being separate from resources used for synchronization.

In some embodiments, the first transmission portion includes a PSBCH including a UE identifier of the first UE or a beam identifier of the first transmission portion.

In some embodiments, the first transmission portion includes a Sidelink Primary Synchronization Signal (SPSS), a Sidelink Secondary Synchronization Signal (SSSS), and a Demodulation Reference Signal (DMRS), the SSSS and the DMRS having different beam directions.

In some embodiments, the first transmission portion includes a sequence selected based on a UE identifier of the first UE.

In some embodiments, the transmitting, by the first UE, of the first transmission portion includes transmitting the first transmission portion in a resource selected based: on a hash function of a UE identifier of the first UE, or on a pseudo-random number, or on a priority of a Transport Block (TB), that triggered the transmitting of the first transmission portion, or on sensing information.

In some embodiments, the transmitting, by the first UE, of the first transmission portion includes transmitting the first transmission portion in a slot selected based on sensed availability of resources in a previous slot.

In some embodiments: a Physical Sidelink Shared Channel (PSSCH) includes the first transmission portion and the second transmission portion; the first transmission portion includes a first reference signal; and the second transmission portion includes a second reference signal.

In some embodiments, the method further includes: receiving, by the first UE, from a second UE, a third transmission portion; and using, by the first UE, the third transmission portion for a synchronization adjustment specific to the second UE when transmitting a TB to the second UE.

In some embodiments: the first transmission portion includes a reference signal and control information, and the second transmission portion includes a reference signal and control information.

In some embodiments, the method further includes: receiving, from a second UE, a Zadoff-Chu sequence transmission in a PSFCH resource indicating that, at the time of a scheduled first transmission by the first UE, the second UE will not be sensing in the direction of the first UE; and rescheduling, by the first UE, the first transmission.

In some embodiments, the method further includes: avoiding transmissions in a first direction, by the first UE, on periodic occasions following an occasion during which sensing information is missed in the first direction due to the receive beam of the first UE being pointed in a second direction, different from the first direction.

In some embodiments, the method further includes: receiving, by the first UE, an assistance transmission from a second UE, the assistance transmission indicating a plurality of future times during which the second UE will be sensing in the direction of the first UE; and transmitting, during a future time within the plurality of future times, by the first UE, to the second UE.

According to an embodiment of the present disclosure, there is provided a User Equipment (UE), including: one or more processors; and a memory storing instructions which, when executed by the one or more processors, cause performance of: accessing, by the UE, configuration data indicating a slot structure including a plurality of resources for transmissions in different directions; and based on the configuration data, transmitting, by the UE, in a single slot, a first transmission portion using a first resource of the plurality of resources with a first beam direction and a second transmission portion using a second resource of the plurality of resources with a second beam direction, different from the first beam direction.

In some embodiments, the first transmission portion is a portion of a Synchronization Signal Block (SSB), and the second transmission portion is a portion of a same SSB.

In some embodiments, the first transmission portion is a portion of a Synchronization Signal Block—like (SSB-like)

transmission, and the second transmission portion is a portion of a same SSB-like transmission.

In some embodiments, the first transmission portion is transmitted in resources from a resource pool that is (pre)-configured by RRC, the resource pool being separate from resources used for synchronization.

According to an embodiment of the present disclosure, there is provided a User Equipment (UE), including: means for processing; and a memory storing instructions which, when executed by the means for processing, cause performance of: accessing, by the UE, configuration data indicating a slot structure including a plurality of resources for transmissions in different directions; and based on the configuration data, transmitting, by the UE, in a single slot, a first transmission portion using a first resource of the plurality of resources with a first beam direction and a second transmission portion using a second resource of the plurality of resources with a second beam direction, different from the first beam direction.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
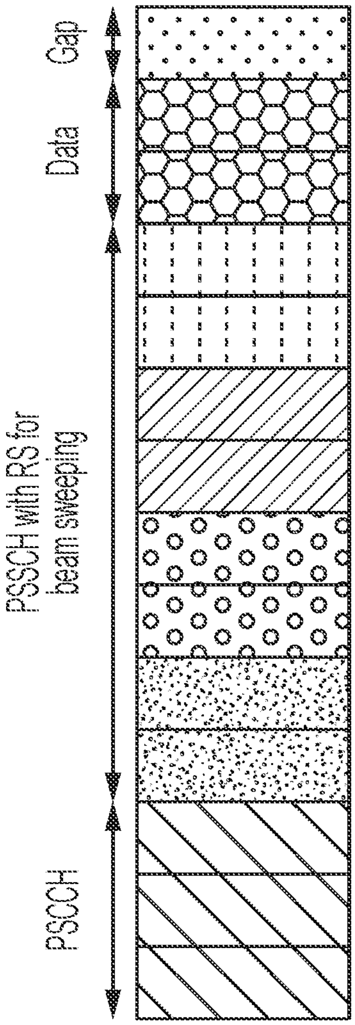
FIG. 1 is a slot allocation diagram, according to an embodiment.
Figure 2:
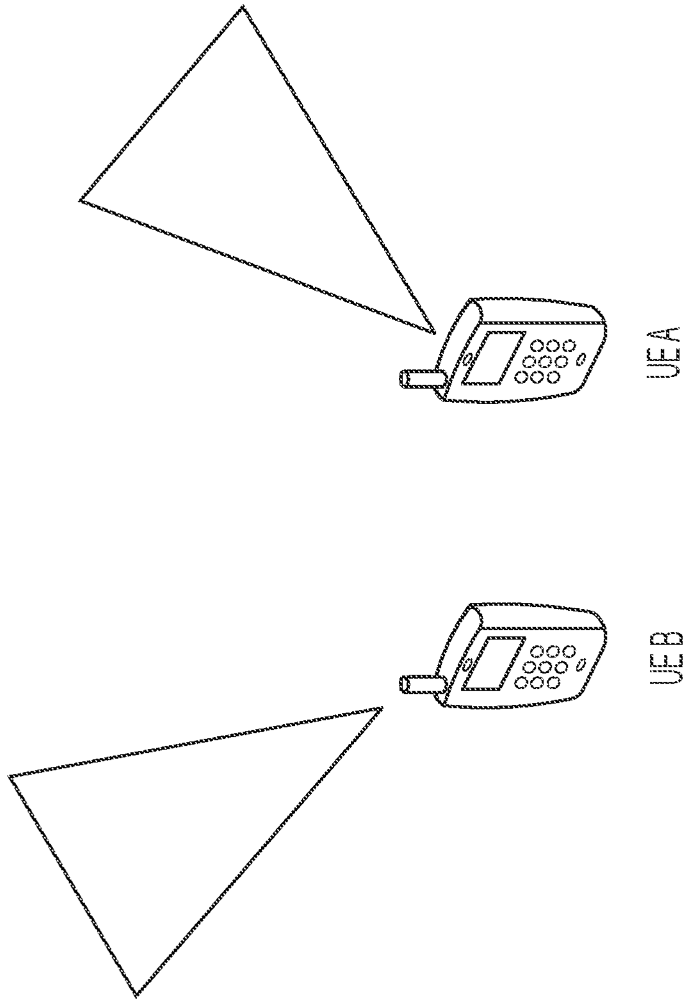
FIG. 2 is a drawing illustrating signal deterioration, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "predetermined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "a portion of" something means "at least some of" the thing, and as such may mean less than all of, or all of, the thing. As such, "a portion of" a thing includes the entire thing as a special case, i.e., the entire thing is an example of a portion of the thing.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. As used herein, the term "or" should be interpreted as "and/or", such that, for example, "A or B" means any one of "A" or "B" or "A and B".

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In New radio (NR) Rel-17 sidelink (SL) (where Rel-17 refers to Release 17 of the $5^{th}$ generation standard (5G) promulgated by the $3^{rd}$ Generation Partnership Project (3GPP)), transmissions between neighboring UEs are made in the sub 6 GHz band. In this band, the use of highly directional antennas to compensate for the path loss is not necessary, and most UEs are able to reach their neighbors within a few hundred meters in all directions with high reliability and data rates that are suitable for basic safety applications. However, for future NR Releases, a wide range of applications drive a need for high data rate and reliable communications. Some examples of such applications include see-through that allows better vision and detection of obstacles for vehicular UEs that are blocked by large cars or trucks, sharing of raw sensor data between neighboring vehicles, and augmented reality applications that may enhance the car riding experience.

Supporting these applications requires a significant amount of spectrum. For this reason, higher frequencies are considered (e.g., Frequency Range 2 (FR2)). The 3GPP is currently investigating the use of FR2 for sidelink communications with a Study Item (SID) approved with the following objectives: (i) Study and specify enhanced sidelink operation on FR2 licensed spectrum [RAN1, RAN2, RAN4] (This part of the work is put on hold until further checking in RAN #97); (ii) Update evaluation methodology for commercial deployment scenario; (iii) Work is limited to the support of sidelink beam management (including initial beam-pairing, beam maintenance, and beam failure recovery, etc.) by reusing existing sidelink CSI framework and reusing Uu beam management concepts wherever possible; and (iv) Beam management in FR2 licensed spectrum considers sidelink unicast communication only.

However, a significant drawback of using FR2 in sidelink may be the need for antenna directivity to compensate for the larger path loss at higher frequencies. When using directive antennas, the receiving (Rx) and transmitting (Tx) UEs may have their beams aligned. Procedures for communication between a gNB and a UE exist. However, these procedures may not be applicable for the sidelink, due to the absence of a central controller and the possibility of high mobility, among other things. This issue may be particularly acute when the link is first established because the two UEs of the link may not have a priori information on where to point their beams. Subsequently, there is a need for initial beam pairing techniques between the Tx and Rx user equipment (UEs).

In this disclosure, multiple procedures for initial beam pairing between NR UEs are disclosed. These procedures allow neighboring UEs to discover the existence of their neighbors and identify their associated beam indices. In addition, techniques to facilitate sensing in FR2 and a technique to resolve potential reservation conflicts when the UE may be unable to simultaneously receive from multiple neighboring UEs that are located in different directions are disclosed. Further, a technique to enhance the synchronization between neighboring UEs in the FR2 domain is disclosed.

Initial beam acquisition in cellular systems for direct link (e.g., Uu link) may be performed as follows. In NR, beam management is defined as follows:

- Beam management: a set of L1/L2 procedures to acquire and maintain a set of transmit reception points (TRPs) or UE beams that may be used for downlink (DL) and uplink (UL) transmission/reception, which include at least following aspects:
- Beam determination: for TRP(s) or UE to select of its own Tx/Rx beam(s).
- Beam measurement: for TRP(s) or UE to measure characteristics of received beamformed signals
- Beam reporting: for UE to report information of beamformed signal(s) based on beam measurement
- Beam sweeping: operation of covering a spatial area, with beams transmitted or received during a time interval in a predetermined way.

Beam management may be performed in a hierarchical manner (e.g., initial acquisition identifies a relatively wide beam, while the subsequent beam refinement identifies a more directional and higher gain beam). In the downlink direction, the UE may complete beam selection based upon the transmission of synchronization signal/Physical broadcast channel (SS/PBCH) blocks and channel state information (CSI) reference signals. Beamforming coefficients applied to the set of SS/PBCH blocks may be used to generate relatively wide beams for initial acquisition. In contrast, beamforming coefficients applied to the set of CSI reference signal resources may be used to generate more directional beams for subsequent beam refinement.

A UE in radio resource control (RRC) idle mode establishes uplink and downlink beam pairs during the random access procedure. At this point, the UE may be measuring the reference signal received power (RSRP) from the set of SS/PBCH blocks for the purpose of cell reselection. In addition, the UE has already acquired the set of system information blocks (SIBs) so it is already aware of the association between the set of SS/PBCH blocks and the set of physical random access channel (PRACH) preambles.

The set of SS/PBCH blocks are time multiplexed with a maximum of two SS/PBCH blocks per slot. The base station applies a different set of beamforming coefficients to each SS/PBCH block to generate the set of eight beams. When initiating the transition to RRC connected mode, the UE identifies the best SS/PBCH block and selects a contention-based PRACH preamble corresponding to that SS/PBCH block. At this point the UE is aware of the downlink beam pair (e.g., the best downlink beam at the base station and best downlink beam/antenna panel at the UE if supported). Subsequently, it assumes uplink/downlink beam correspondence so the selected downlink beam pair may also be adopted as the selected uplink beam pair. The UE then proceeds to transmit the selected PRACH preamble using the appropriate random-access occasion. Upon reception of the PRACH preamble, the base station becomes aware of the SS/PBCH block selected by the UE and thus is aware of the beam to be used for subsequent downlink transmission and uplink reception.

Once a UE has entered RRC connected mode, it may be possible to initiate a beam refinement procedure. This procedure may be used to select beams which are more directional and have higher gain.

The CSI reference signal may be used to support a beam refinement procedure. For example, a set of four CSI reference signal resources may be associated with each SS/PBCH block. The base station may apply a different set of beamforming coefficients to each CSI reference signal resource to generate four directional beams per SS/PBCH block. Subsequently, the UE may perform the necessary measurements based on the transmitted CSI reference signals and accordingly report the best beam index.

One component of beam tracking may be the ability of the Tx UE to perform transmit beam sweeping. This helps in identifying the best beam to switch to when the current active one drops below a threshold. To achieve this goal, the Tx UE may be expected to send multiple reference signals each of which points in a specific transmit beam direction. Despite the simplicity of such a method, two factors must be considered:

- The delay incurred by the transmit beam sweeping, especially if the transmit beams are sent in a time-division multiplexed fashion over multiple slots.
- The resource blocks (RBs) over which these beams are sent since all Mode 2 based SL transmissions are opportunistic.

To reduce the delay incurred, one possible approach is to consider a special resource (this resource may be either a special slot within a regular resource pool, a subset of subchannels within a slot of a regular resource pool, or a special resource pool) for beam sweeping. In this special slot, multiple reference signals are sent either in consecutive or non-consecutive orthogonal frequency division multiplexing (OFDM) symbols, and the reference signals within each (one or subset) of symbols are sent in different transmit beam directions. Subsequently, at the Rx UE side, the Rx UE may perform the signal to interference plus noise ratio SINR measurements over these reference signals and accordingly identify (i) whether the current beam offers the best link quality or not and (ii) in the latter case, what the best beam to switch to is. The resource pool comprises several subchannels and several time slots.

The number of consecutive or non-consecutive OFDM symbols over which the reference signals (RSs) are sent before switching to the subsequent beams and the number of beams that may be swept in a given slot may be configured per resource pool and may be dependent on priority. For example, one possible configuration is that in a given slot, beams may be swept such that the reference signals of each beam are sent over two consecutive OFDM symbols. This example is depicted in FIG. 1. While not shown in FIG. 1, one or more symbols after the PSCCH may be used for transmitting the second stage sidelink control information (SCI).

Since the Rx UE may be aware of the resource pool configuration, it may perform the measurements over all the transmitted beams and accordingly identify the transmit beam index that offers the best link quality. The location (e.g., the starting symbol and starting RB) of the first reference signal within the special slot may also be configured per resource pool. In addition, the intensity of the reference signals within a symbol (e.g., the number of RBs occupied by the reference signals and the number of resource elements REs per RB occupied by the reference signals) may also be configured per resource pool. The REs not occupied by the RSs may be used to send a payload to the Rx UE. To further simplify the process and eliminate the need for special slot indication, the special slot may be configured to be periodic with a specific duration. For example, when FR2 is used, the fifth transmission may always be a special slot for beam sweeping. This period may be configured per resource pool as a single value or may be dependent on priority or relative speed. For example, for higher priority traffic, the period may be decreased so that beam sweeping may be done more frequently to maintain the link quality. In addition, it may also depend on the relative speed of the Tx and Rx UEs since for low speeds, it may be expected that the link quality will not change very fast. In addition, the Tx UE may also indicate the presence of the special slot to the Rx UEs. To be able to transmit the special slots periodically, a Tx UE may be required to send a periodic reservation. In this reservation, an additional flag may also be included in the SCI to indicate the presence of a special slot as is discussed below. Alternatively, it may also send the special slot aperiodically by reserving a future slot and including a flag in the SCI to indicate the presence of a special slot.

When establishing a communication link in FR2, the two UEs participating in the radio link may have their antenna pointed at each other in order to have sufficient link budget. This may be because if the antennas pointed in opposite directions as shown in the figure below, the signal quality will be deteriorated.

For a link between a gNB and a UE, this may be achieved by linking the RACH opportunity to a specific beam direction. This may be possible because the radio link may be managed by the gNB, with the gNB providing all the information to ensure beam alignment by providing the RACH opportunity mapping. On the sidelink, at least for Mode 2, the system may be fully distributed, and there may be no entity that provides information to align beams. Therefore, a method to ensure initial beam pairing on the sidelink may be used.

This disclosure discusses initial beam pairing and proposes multiple procedures to enable neighboring UEs to identify the best beam indices for their transmissions. Two approaches (one based on Synchronization Signal Block (SSBs) and another based on special slots) to perform beam sweeping and identify the presence of neighboring UEs are discussed herein. In the first approach, each UE periodically transmits SSBs for beam sweeping. These SSBs are periodically sent in a special resource pool to enable the neighboring NR UEs to perform beam sweeping and identify the best performing beams. In a second approach, reference signals are transmitted in special slots in regular or special resource pools specifically introduced to perform beam sweeping.

In addition, a procedure to resolve conflicts in future reservations due to the directivity constraints of FR2 is introduced. Furthermore, a conservative approach based on the half-duplex constraint of NR Rel-16 is introduced to combat the performance degradation due to the directivity limitations in FR2. Finally, we also propose updates to the Mode 2 resource selection procedure that relies on exchanging sensing patterns between neighboring UEs to resolve the impact of directivity on the detection of resource reservations by neighboring UEs.

Several categories of methods are discussed herein, including: (i) initial beam pairing based on SSB-like or SSB transmissions in special resource pool, (ii) initial beam pairing based on reference signals in regular/special resource pools (iii) enhancing synchronization accuracy by using the beam sweeping SSBs (iv) conflict in Future reservations due to directivity, (v) using the half-duplex constraint to resolve the impact of directivity constraint on sensing, (vi) maintaining beam sweeping transmissions after initial link establishment, and (vii) sensing for Mode 2 resource selection with directivity.

Initial beam pairing based on SSB-like or SSB transmissions in a special resource pool may proceed as follows. Similar to NR Uu, beam sweeping may involve sending multiple beams in different directions by one UE while the neighboring ones perform the measurements and select the best performing beam for upcoming transmissions. However, unlike the NR Uu, the synchronization source that is sending the SSBs (e.g., the gNB) may not be involved in sidelink communications. To overcome this issue, each NR UE may send multiple SSBs or SSB-like transmissions each using a different beam. For example, each NR UE may send SSBs or SSB-like transmissions with a specific periodicity and within each period, the UE sends multiple SSBs or SSB-like transmissions, each pointing in a different beam direction (e.g., beam sweeping may be done within each SSB period). In addition, within each period, an NR UE may send multiple SSB or SSB-like transmissions with the same beam index (e.g., pointing in the same direction) to enable Rx sweeping. This may be done when Rx beam sweeping is configured. The periodicity with which the SSBs or SSB-like transmissions are sent may be dependent on the priority of the Transport Block (TB) that a UE is attempting to transmit and the measured CBR (channel busy ratio). For instance, when the channel is not highly occupied (e.g., the CBR is low) the NR UEs may send the SSBs or SSB-like transmissions more frequently to reduce latency and to quickly discover the presence of their neighboring UEs. This “SSB-like” signal is not for synchronization, and as such it may be different than the existing SSB, and may use different sequences, or different resources, or a different scrambling sequence, or a different format. However, at a high level, the structure may be similar, and RSs enabling some level of synchronization may also be used. In addition, the information that may be transmitted in such an SSB-like transmission may comprise a transmitter UE ID, and a beam index ID.

Without loss of generality in the remainder of this disclosure, both SSBs and SSB-like transmissions may be referred to as SSBs. The transmitted SSBs for initial beam pairing may be different from the SSBs sent for synchronization since they serve a different purpose. For example, they may have the following characteristics:

- The beam pairing SSBs may be sent by multiple neighboring UEs simultaneously.
- The beam pairing SSBs may be sent in a special resource pool.
- The periodicity with which the beam pairing SSBs may be sent may be the same for all UEs; however, UEs with lower latency requirements may randomly select additional resources within the SSB period to achieve faster beam sweeping.
- The transmission of beam pairing SSBs may be impacted by a congestion control metric and the priority of TB transmissions.
- A simplified version of the SSB may be sent in the special resource pool. For example, a new SSB format may be employed that consists only of the Primary Synchronization Signal (PSS) (or Sidelink Primary Synchronization Signal (SPSS)), the Secondary Synchronization Signal (SSS) (or Sidelink Secondary Synchronization Signal (SSSS)), and one or more Demodulation Reference Signals (DMRSs).
- The number of symbols occupied by the SSBs may be less than one slot duration to allow multiple beams to be swept within a slot (e.g., the SSB may occupy 7 symbols rather than 14 symbols to allow the sweeping of two directions per slot).

Figure 3:
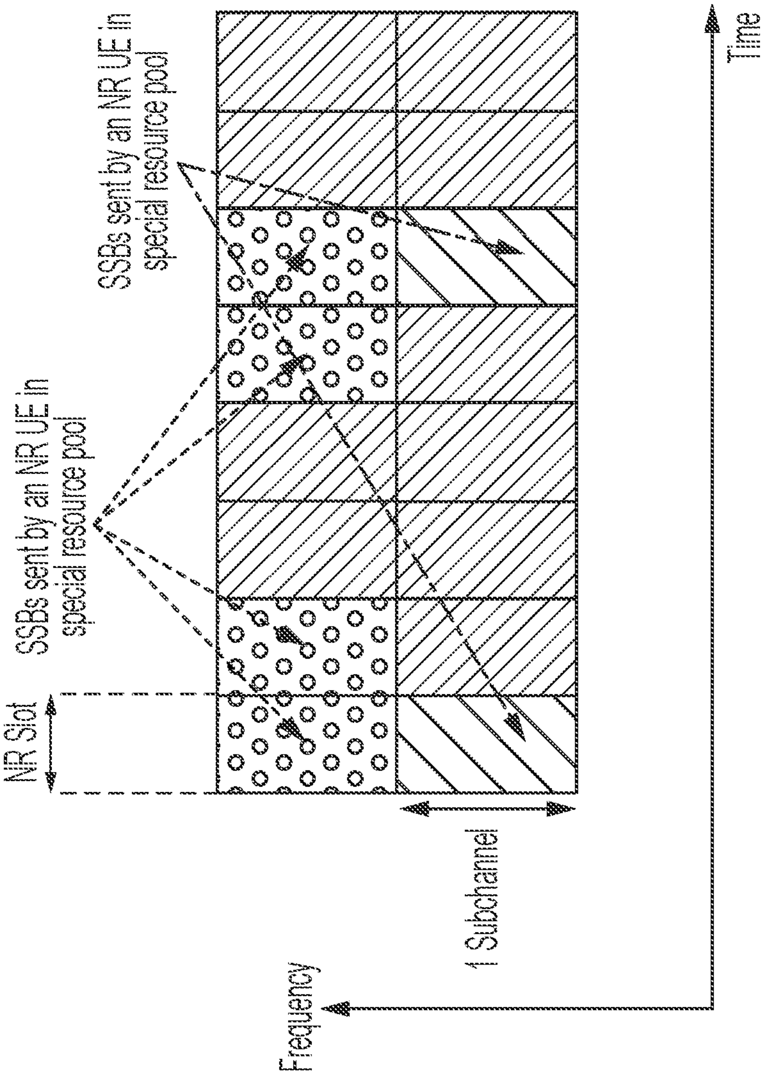
FIG. 3 is a resource allocation diagram, according to an embodiment.

An example of NR SSB transmissions in a special resource pool is captured in FIG. 3.

An NR UE attempting to communicate in the FR2 range may first obtain the RRC configuration or rely on preconfiguration to identify the special pools that it may use to transmit the beam pairing SSBs. A special resource pool for beam pairing SSB transmissions may be used to avoid confusion with neighboring NR UEs attempting to perform synchronization. For example, any neighboring NR UEs that receive SSBs in the special resource pool will not use such SSBs for synchronization but instead for neighbor detection and initial beam pairing. A UE intending to transmit in the special resource pool may apply a modular operation on its physical UE ID to identify the time-frequency (e.g., the slot index and the subchannel) resources that it will be using to send the SSBs. For example, a UE may apply a modular operation on its UE ID to identify the time-frequency resource it will use to transmit the initial beam pairing SSBs. However, a drawback of this approach is that it may result in consistent collisions between neighboring UEs when transmitting their SSBs if their UE IDs are similar. This issue is magnified if the number of available resources within the special resource pool is limited. To address this drawback, one possibility is to rely on a hash function that may be applied on the UE ID or on part of the UE ID when selecting the resource to transmit its SSB. In such a case, consecutive SSB transmissions may occur on different resources thus reducing the chances of consistent collisions. For example, when selecting the first resource for SSB transmission, the UE may rely on the two least significant bytes of its UE ID whereas for the following SSB transmission it may rely on the following two bytes of its UE ID. Furthermore, the periodicity by which the SSB is transmitted is fixed and may be configured per resource pool. However, UEs with lower latency requirements may be allowed to randomly select additional resources within the SSB period to perform additional beam sweeping (e.g., sweep multiple beam indexes within one period rather than one beam index per period). These additional resources may be either randomly selected from the same special resource pool or they may come from other resource pools. If no additional resources are selected, then the NR UE is expected to sweep only one beam index per SSB period. This is unlike the beam sweeping in the Uu link in which all the beams are swept within one SSB period.

To enable the Rx UE to identify the beam index, there may be a one-to-one mapping between the time-frequency resource index and the beam index. The reason for this is to simplify the detection of the beam index by neighboring UEs. For example, since all UEs are assumed to be synchronized, a receiving UE will be able to identify the slot index in which the SSB is sent within the special resource pool. Based on this, it may identify the beam index based on the pre-defined one-to-one mapping. Alternatively, some of the SSB fields may be repurposed when the SSB is used for initial beam pairing. For example, the slot index field in the Physical Sidelink Broadcast Channel (PSBCH) that is transmitted within the SSB may be used to refer to the beam index rather than the slot index since all neighboring UEs are assumed to be synchronized. In such a case, when the SSB is sent in the special resource pool, one or more fields within the SSB may be used to indicate the beam index.

It may be advantageous for an NR UE to be able to link the transmitted SSB with the actual Tx UE ID in order to use it later when transmitting to that UE. For example, the Rx UE ID sent in the sidelink control information is 16 bit and it may be used by the UE to be able to reach its destination UE. To achieve this, two options may be considered based on resource pool configuration. In one option, an NR UE may rely on a combination of the Sidelink Synchronization Signal Identifier (SLSSID) obtained through the PSS and SSS signals as well as the PSBCH payload. For example, 9 bits of the Tx UE ID may be carried in the SLSSID whereas the remaining 7 bits may be carried in the PSBCH (e.g., by reusing the tdd-configuration field).

In a second option, an NR UE may rely on a combination of the SLSSID obtained through the PSS and SSS signals as well as the resource over which the SSB is transmitted. For example, the special resource pool may be configured to have X candidate resources for PSBCH transmissions (X being a positive integer) and the selection of the resource to transmit the SSB may be done by using the (log 2 X) least significant bits of the Tx UE ID. Subsequently, the remaining bits of the Tx UE ID may be carried in the SLSSID.

Figure 4:
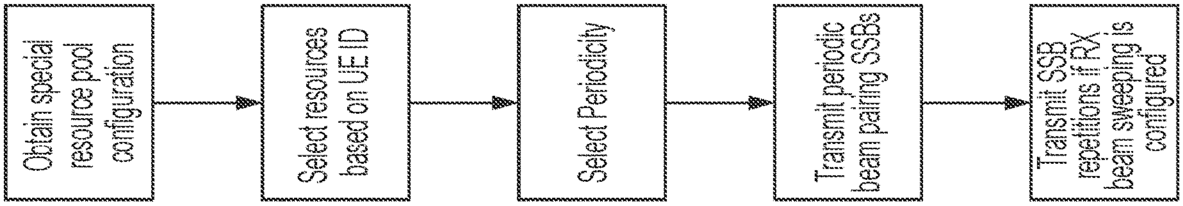
FIG. 4 is a flow chart, according to an embodiment.

The initial-beam pairing SSB transmission procedure of some embodiments is summarized in the flowchart of FIG. 4.

A number of embodiments, referred to herein as "Embodiment 1" through "Embodiment 43" are disclosed below.

Embodiment 1: One or more special resource pools is (pre-)configured for SSB transmissions for initial beam pairing between neighboring UEs. The (pre-)configuration may be done by RRC signaling.

Embodiment 2: The SSB or SSB-like transmissions in the special resource pool may be periodic and the periodicity may be configured per resource pool.

Embodiment 3: Higher-priority traffic or UEs with low latency requirements may use additional resources to sweep multiple directions per SSB period. The resources used to send the additional SSBs per SSB period may be either randomly selected from the same resource pool or from a different resource pool. The transmission of the additional SSBs per period may also be dependent on CBR.

Embodiment 4: The SSBs used for initial beam pairing may be separately configured from the ones used for synchronization. For example, a new SSB format without PSBCH payload or an SSB with fewer OFDM symbols may be used for the purpose of beam sweeping.

Embodiment 5: A one-to-one mapping may be established between the time-frequency resource in a special resource pool and the beam index, to enable the Rx UE to easily detect the beam index.

Embodiment 6: A UE may either apply a modular operation or a hash function that is time dependent on its physical layer identifier (PHY ID) to identify which time-frequency resources it should use to send its beam pairing SSBs.

Embodiment 7: A UE may indicate the beam index by reusing one or more of the fields (e.g., the slot index) of the SSB sent in the special resource pool.

Embodiment 8: The Tx UE ID associated with the SSB transmission in the special resource pool may be conveyed to the Rx UE by one of the following techniques based on resource pool configuration:

- The Tx UE ID may be conveyed in the SLSSID and the PSBCH payload.
- The Tx UE ID may be conveyed in the SLSSID and the index of the selected resource for SSB transmission.

If the system is highly occupied and the selection of resources to transmit the SSBs within the special resource pool is dependent only on the UE ID, it may be likely that collisions will occur. This issue is magnified in cases in which the special resource pool is associated with a limited number of resources. To address this issue, the following approaches may be considered:

- Sensing before transmitting in the special resource pool. Sensing here may be different from regular Mode 2 sensing. For example, sensing in the special resource pool may rely only on RSSI detection to determine the presence or absence of SSBs.
- Dynamically allocating more resources to the special resource pool based on channel occupancy.
- Access to specific special resource pools may be restricted based on TB transmission priority.
- Transmission of SSBs in the special resource pool may be dependent on whether the UE has a TB to transmit.
- A UE may be restricted from sending initial beam pairing SSBs if it has already transmitted SSBs recently (e.g., if the beam sweeping timer has not expired) or if it has not moved much from its latest location, or if its speed is low.
- A UE may be restricted from sending initial beam pairing SSBs if it has received a TB recently from the target Rx UE in case of unicast.
- A simplified version of the SSB may be sent in the special resource pool to consume less resources per SSB transmission. For example, a new SSB format may be considered that consists only of the PSS, SSS, and DMRS.
- The number of symbols occupied by the SSBs may be less than that corresponding to one slot duration to allow multiple beams to be swept within a slot (e.g., the SSB may occupy 7 symbols rather than 4 symbols to allow the sweeping of two directions per slot) to allow for more candidate resources for SSB transmissions within the resource pool.
- The number of beams swept within an SSB period may also depend on the TB priority.
- More than one resource pool may be configured for SSB transmissions whereas in each resource pool the allowed beam width(s) and SSB periodicity may be pre-configured.

To elaborate, an NR UE may be required to perform sensing for a given duration before attempting to transmit its SSB for initial beam pairing. This sensing may be required to be periodic (e.g., before each periodic SSB transmission)

or only when a UE first attempts to transmit in the special resource pool and its duration may be configured per resource pool. One reason for this sensing is to detect SSB transmissions of neighboring UEs in the resource pool. For example, the NR UE may either randomly select a resource or rely on its PHY ID to select a resource within the special resource pool for its SSB transmissions. If, after performing sensing, the resource within the special resource pool on which the UE intends to transmit its SSB is occupied by a neighboring UE (e.g., the received RSRP level of the neighboring UE is above a threshold), it may then either defer its transmission until the resource becomes available or randomly select a different resource from the set of available resources based on its sensing information (such random resource selections may not be possible, however, if the resource pool is configured to convey the Tx UE ID by using the selected resource index). In addition, the number of resources allocated for the special resource pool may be dependent on channel occupancy. For instance, multiple special resource pools may be configured for UEs to transmit their initial beam pairing signals. These pools may be overlapping with regular resource pools and may be accessible only when the CBR is high. Although this may result in collisions with transmissions in the overlapping regular resource pools, these collisions may be mitigated by the sensing described above. Alternatively, a UE may be required to send a periodic reservation signal after it performs sensing to indicate the resource reservation to regular UEs in the overlapping regular resource pools. Subsequently, it may use the periodic reservation in the regular resource pool to block regular UE transmissions from colliding with its SSB transmissions in the overlapping special resource pool.

Another approach to reduce the chances of collisions in special resource pools is to rely on TB priority. For example, multiple special resource pools may be configured and the access to such resource pools may be dependent on priority. For instance, a UE with highest priority may have access to all configured special resource pools to send its SSB signals whereas another UE with lower priority may be restricted to perform its transmission in a subset of the special resource pools. To achieve this, a priority threshold may be associated with each special resource pool and the UEs with priority higher than this threshold may have access to the special resource pool. A UE with no upcoming TBs may rely on a pre-configured priority to obtain access to the special resource pools. Alternatively, a UE with no upcoming TBs for transmission may be restricted from transmitting initial beam pairing SSBs in the special resource pool. This restriction may be applied only when the CBR is above a certain threshold.

Another aspect of some embodiments is the validity of the initial beam pairing SSBs. For example, if a UE transmits SSBs very frequently it may result in overwhelming the system and eventually result in collisions. To address this drawback, each transmission of beam pairing SSB may be associated with a validity timer (e.g., a minimum time gap between consecutive periodic SSB transmissions) to reduce the number of transmissions in the special resource pool. This restriction may also be associated with the UE speed. For example, if a UE has not moved since the last beam pairing SSB transmission, then it may not be allowed to transmit another beam pairing SSB for a given duration. In other words, the frequency for transmitting the beam pairing SSBs may be dependent on UE speed. Multiple speed thresholds may be pre-configured per resource pool, and a speed below a given threshold may dictate a specific frequency for transmitting the beam pairing SSBs.

Another possibility to reduce the chances of collisions in the special resource pool is to eliminate the unnecessary SSB transmissions. For example, if a UE A has a TB to transmit to UE B and UE A has received a TB from UE B recently (with a given validity timer) then it is expected to be aware of the UE location and thus may not be allowed to trigger a beam pairing SSB transmission if the target UE for its TB is UE-B (e.g., a unicast transmission to UE B). When a UE receives an SSB in the special resource pool, it may be able to determine the beam index of the transmitting UE by relying on the resources in which the SSB is sent. In addition, it may be able to determine the transmitting UE ID. This may be obtained from the used SLSSID as mentioned above. Subsequently, the receiving UE may be restricted from sending additional SSBs for any future communications with the transmitting UE for a given duration.

Figure 5:
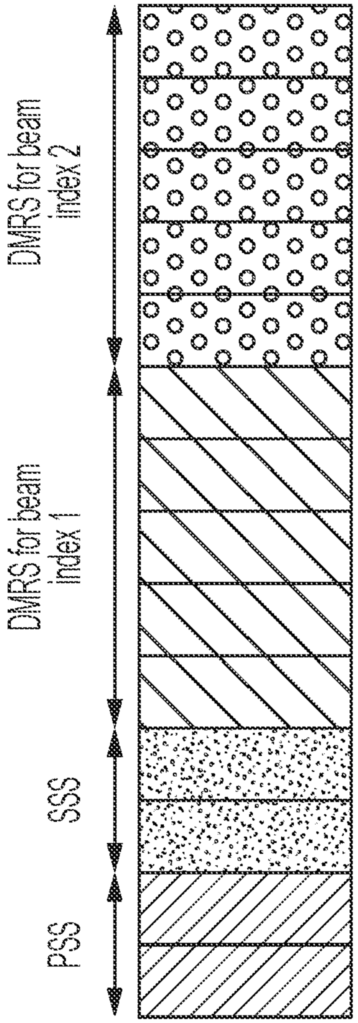
FIG. 5 is a slot allocation diagram, according to an embodiment.

Despite the advantages and simplicity of achieving initial beam pairing through SSB transmissions in a special resource, a drawback of this method is the overhead related to the PSBCH payload which is sent but not actually needed. For example, the "tdd_configuration" field in the PSBCH may not be needed for initial beam pairing. One possibility, to reduce the overhead, is that the UEs may transmit a simplified version of the SSBs rather than sending full SSBs in the special resource pool. For example, it may transmit the S-PSS and S-SSS followed by one or more symbols carrying DMRS rather than sending the complete SSB for each direction. In such a case the following two gains may be achieved:

- The unnecessary fields of the PSBCH may not be transmitted.
- A UE may sweep multiple beams in one slot by sending multiple DMRS in either consecutive or non-consecutive symbols after the S-PSS and S-SSS. In this case, the mapping between the slot in which the S-SSS-PSS/S-SSS/DMRS is sent and the swept beam(s) may be maintained. This mapping may be established by pre-configuration. Subsequently, a UE receiving a reduced SSB in a slot will be able to identify the beam index. For example, if two beams are swept per slot (e.g., the first 6 symbols are used to sweep the first beam index and the following 6 symbols are used to sweep the second beam index) then a time-frequency resource X in a special resource pool may be mapped to beam indexes Y and Y+1. One example of the reduced SSB for beam sweeping is captured in FIG. 5. In the embodiment of FIG. 5, the transmission may include (i) a first transmission portion (e.g., the first DMRS), transmitted with a first beam direction and (ii) a second transmission portion (e.g., the second DMRS), transmitted with a second beam direction, different from the first beam direction. The first transmission portion may not include user-specific data (e.g., being a DMRS), and the second transmission portion may not include user-specific data (e.g., being a DMRS). The transmitting of the first transmission portion and the second transmission portion may be in accordance with a slot structure configuration, which may configure the UE to transmit both the first transmission portion and the second transmission portion in a single slot. The UE may perform the transmitting after accessing the configuration data (which may, e.g., be stored in the UE).

Another possibility to reduce the overhead is reducing the number of symbols occupied by the SSBs, thus allowing the transmission of multiple SSBs within a slot. For example, the duration of the SSB transmission may be less than one slot duration to allow multiple beams to be swept within a slot (e.g., the SSB may occupy 7 symbols rather than 14 symbols to allow the sweeping of two directions per slot). In this case, each slot may be either used by one UE to sweep two beams or it may used by more than one UE when transmitting their SSBs thus reducing the chances of collisions between neighboring UEs. The reduction in the number of symbols occupied by the SSB may be achieved by reducing the PSBCH payload so as not to impact the reliability of the PSBCH reception. For example, some of the fields such as the tdd-configuration that is carried within the PSBCH may be removed, thus reducing the number of symbols occupied by the PSBCH.

Another approach to reduce the overhead is to allow NR UEs to sweep with different beamwidths based on their TB priority. In this case, higher priority TB transmissions may perform beam sweeping over a larger number of beams with finer beamwidths to improve their throughput whereas a low priority TB transmission may sweep over a smaller number of beams with larger beamwidth. The beam granularity may be indicated in the PSBCH payload that is carried in the SSB. To indicate the beam width, either a new field may be added or an existing field within the current SSB may be repurposed. One example of the latter is the use of the tdd-configuration field of the PSBCH to indicate the beam granularity since this tdd-configuration may be obtained during synchronization. Alternatively, a two-bit field may be added to the PSBCH payload to indicate the beamwidth if multiple beamwidths are configured per resource pool. In both cases, the receiving UE may be able to identify the actual beam index based on the resource over which the SSB is transmitted. For instance, a UE may be configured with two tables for beams each with a different beamwidth and rely on the index obtained from the SSB to identify which beam from the table is the one that was received. These tables and the allowed beamwidth may also be configured per resource pool. For example, more than one resource pool may be configured for SSB transmissions and in each resource pool a specific respective beamwidth may be used. The accessibility of these resource pools may be dependent on TB priority and CBR. For instance, one resource pool such as the one with finer beam granularity may be accessible only by UEs with higher priority TB transmissions.

Embodiment 9: Collisions between SSB transmissions in special resource pools may be reduced by one or more of the following approaches:

- Sensing before transmitting in the special resource pool.
- Dynamically allocating more resources to the special resource pool based on channel occupancy.
- Access to additional resource pool may be restricted based on TB transmission priority.
- Transmission of SSBs in the special resource pool may be dependent on whether the UE has a TB to transmit.
- A UE may be restricted from sending initial beam pairing SSBs if it has transmitted SSBs recently (e.g., if the beam sweeping timer has not expired) or if it has not moved much from the location at which it transmitted its most recent previously transmitted SSB.
- A UE may be restricted from sending initial beam pairing SSBs if it has received a TB recently from the target Rx UE.

Embodiment 10: A new SSB format may be transmitted for initial beam pairing in the special resource pool. This SSB may be limited to only the S-SSS-PSS, S-SSS, and DMRS signals.

Embodiment 11: A new SSB format with fewer OFDM symbols per slot may be used for initial beam pairing in the special resource pool (e.g., the SSB may occupy 7 symbols rather than 14 symbols to allow the sweeping of two directions per slot).

Embodiment 12: A UE transmitting the new SSB format may sweep multiple beam indexes per slot.

Embodiment 13: The number of beams swept within an SSB period and the beamwidth for each SSB transmission within the SSB period may be dependent on priority.

Embodiment 14: A UE may indicate within the PSBCH payload (either implicitly or explicitly) the beamwidth used for beam sweeping if multiple beamwidths are configured per resource pool.

Embodiment 15: More than one resource pool may be configured for SSB transmissions and in each resource pool the allowed beamwidth(s) and the number of retransmissions within an SSB period may be pre-configured.

Initial beam pairing based on reference signals in regular/special resource pools may be implemented as follows. While sending SSBs in special resource pools for beam sweeping for initial beam pairing is beneficial, it may not always be the best applicable solution:

- The dedication of special resource pools for initial beam sweeping may impact resource utilization. This issue may be magnified in cases when the system is highly occupied.
- The selected resources for transmissions in the special resource pool may be based either on sensing or on the Tx UE ID instead of future reservations and thus may be vulnerable to collisions between neighboring UEs especially in scenarios when the system is highly occupied.

Figure 6:
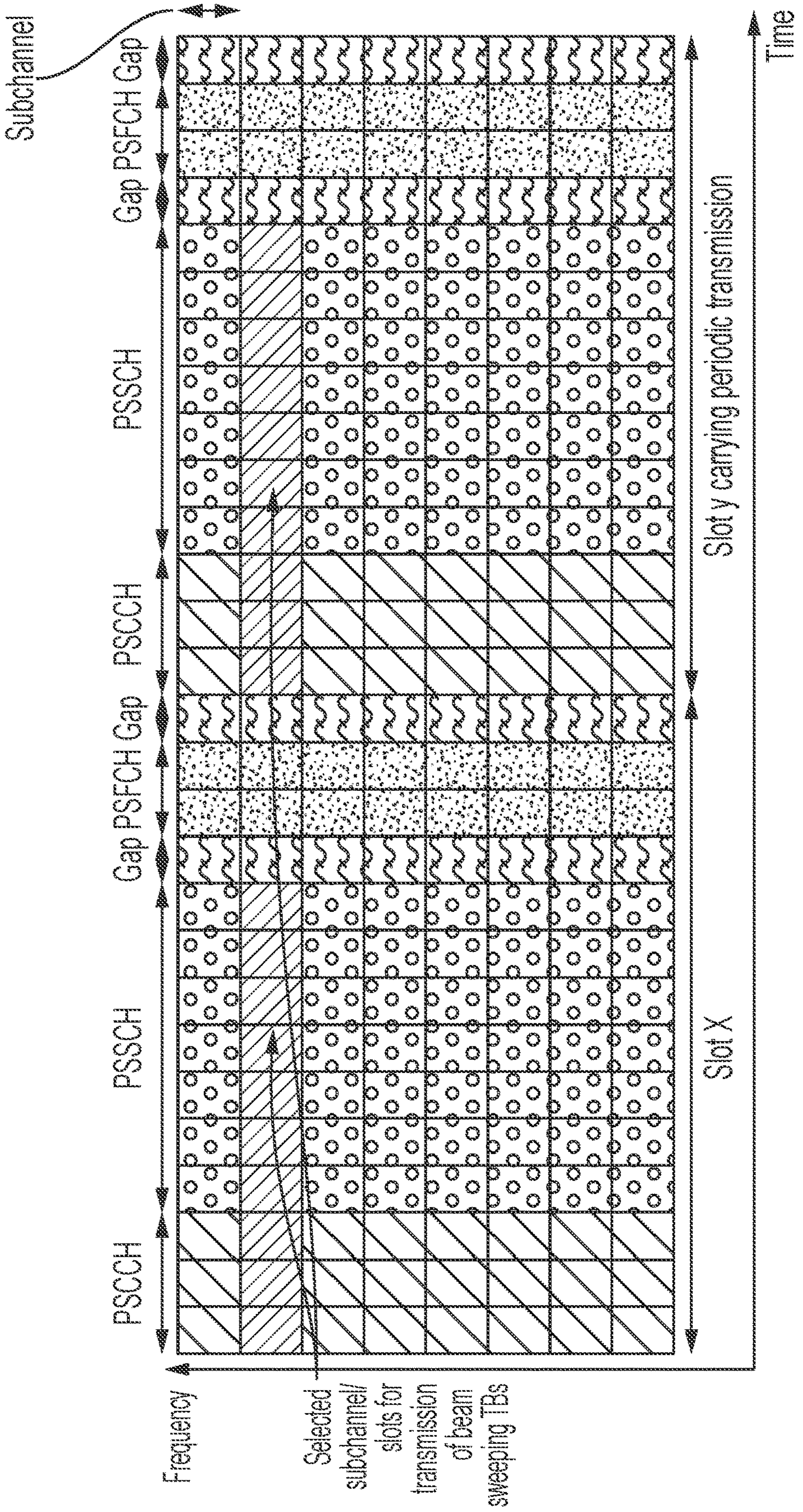
FIG. 6 is a resource allocation diagram, according to an embodiment.

To address these drawbacks, one possibility is to rely on performing regular reservations for beam sweeping in regular resource pools. For example, a UE may perform a periodic reservation in the regular resource pool with multiple blind transmissions within each period and use it for beam sweeping as shown in FIG. 6. In this case, each UE may use a different beam index in each of the blind retransmissions and accordingly rely on the PSFCH (e.g., on the ACK/NACK) feedback to obtain the beam index that may be used to reach the Rx UE. The transmission of the beam sweeping may also be aperiodic and may be dependent on the presence of a TB that a UE plans to transmit. There may not be a one-to-one correspondence between the slot index and the beam index and thus, in some embodiments, the beam index may be included either in the 1st or 2nd stage SCI explicitly or implicitly for low latency applications. For example, a new field may be added to either the 1st or 2nd stage SCI to indicate the beam index. Alternatively, the beam index may be indicated implicitly by setting one or more fields to specific values (e.g., by using a reserved Time Resource Indication Value (TRIV) or a reserved Frequency Resource Indication Value (FRIV) or a new 2nd stage SCI format). Another possibility is to rely on a Media Access Control Control Element (MAC CE) to carry the beam index, the MAC CE being carried in the associated Physical Sidelink Shared Channel (PSSCH) and providing guidance on the selected beam index.

An NR UE may be performing the beam sweeping to all neighboring UEs (e.g., there is no specific target Rx UE) within a groupcast. In this case, the Tx UE may rely on using a special destination UE ID that indicates a groupcast message with beam sweeping. Subsequently, multiple neighboring UEs may be required to respond back with ACK/NACK feedback to indicate the selected beam, which may create another problem. For example, it may be challenging for the Tx UE to distinguish between multiple neighboring UEs when they respond to the beam sweeping TB. To achieve this, one possibility is to rely on different offsets for different UEs, in a manner similar to the approach considered for groupcast option 2 in NR Rel-16 sidelink. For example, each UE may obtain a member ID when it first joins the groupcast or based on its UE ID by applying a modular operation. For instance, if a TB transmission has an associated 10 Physical Resource Blocks (PRBs) for PSFCH based on the resource pool configuration, then 30 offsets may be used by the neighboring UEs (60 sequences are available, and each UE may be assigned a pair, one for ACK and another for NACK) to provide their feedback. In this example, a UE with ID 40 may use offset 10 and a UE with ID 310 may also use offset 10. Alternatively, a no NACK-based approach may also be considered whereby a UE may have access to only one sequence rather than a pair and transmit this sequence in response to successfully decoding the SCI. This single sequence approach may also be applied based only on resource pool configuration and may be limited to scenarios in which the beam index is carried in the SCI and not the PSSCH since a UE may not be able to NACK the payload. Finally, when the UE receives at least one ACK from each member of the groupcast, it may accordingly identify the beam indexes to use in future transmissions when attempting to reach the Rx UEs within the groupcast.

In case of broadcast, a Tx UE may not be expecting ACK/NACK feedback from neighboring UEs. In this case, the NR UEs are expected to provide their feedback on the selected beam index in a separate transmission. For example, the responding UE(s) may perform a future reservation with the Tx UE ID as the destination ID and provide their ID along with their selected beam index. The selected beam index may be carried either implicitly or explicitly in the 1st or 2nd stage SCI or as a MAC CE in the PSSCH.

Embodiment 16: A UE may perform the beam sweeping in the regular resource pool by performing a periodic reservation and sending TBs with different beam indexes.

Embodiment 17: The beam index may be either carried in the 1st or 2nd stage SCI or as a MAC CE.

Embodiment 19: Neighboring UEs may acknowledge their presence by sending an ACK/NACK in the PSFCH channel. Different UEs that are targeted by the groupcast may have different member IDs based on their PHY IDs or by assignment when they initially join the groupcast.

Embodiment 20: A NACK only approach may be considered for the initial beam pairing feedback to reduce the chances of collisions between neighboring UEs.

Figure 7:
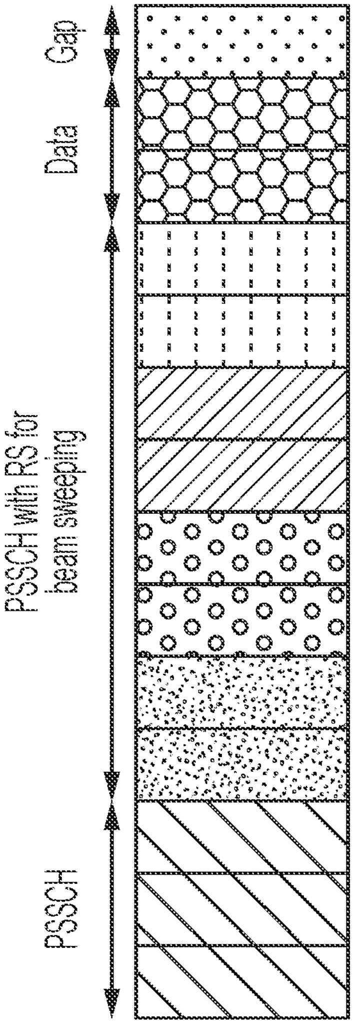
FIG. 7 is a slot allocation diagram, according to an embodiment.

Another approach to achieve the initial beam pairing with low latency is to rely on a special slot structure. For example, instead of sending multiple TBs each transmitted on a different beam corresponding to a different respective beam index to perform the beam sweeping, A UE may send the special slot captured in FIG. 7, which is identical to FIG. 1 (discussed above). In the embodiment of FIG. 7, the transmission may include (i) a first transmission portion (e.g., a first reference signal (RS) of the four reference signals illustrated), transmitted with a first beam direction and (ii) a second transmission portion (e.g., a second reference signal of the four reference signals illustrated), transmitted with a second beam direction, different from the first beam direction. The first transmission portion may not include user-specific data (e.g., being a reference signal), and the second transmission portion may not include user-specific data (e.g., being a reference signal). The transmitting of the first transmission portion and the second transmission portion may be in accordance with a slot structure configuration, which may configure the UE to transmit both the first transmission portion and the second transmission portion in a single slot. The UE may perform the transmitting after accessing the configuration data (which may, e.g., be stored in the UE).

In this slot structure, a UE may sweep multiple beam indexes by sending reference signals each pointing towards a different direction. For example, in FIG. 7, a UE may sweep 4 beam indexes in one slot. The number of beams that may be swept within a special resource pool may be configured per resource pool. In addition, the number of OFDM symbols occupied by the reference signals associated with a specific beam index and the starting symbol that carries the first reference signal may also be pre-configured per resource pool. When using this approach, an NR UE may use a regular resource pool and accordingly select a resource after performing sensing for periodically sending the special slot structure. The transmission of this special slot may also occur in a special resource pool that is used only to carry beam sweeping reference signals. In case of a special resource pool, there may be a one-to-one correspondence between the Tx UE ID and the resource used for sending the special slot structure in the special resource pool. For example, a UE may apply a hash function or a modular operation on its UE ID to obtain the resources that should be used for transmitting the special slot. In addition, the transmission of this special slot may be aperiodic and dependent only on the presence of a TB that a UE wishes to send.

In the special slot, an NR UE may carry its PHY ID in the SCI along with additional information such as the target RX UE ID and future reservations, if any. Furthermore, for initial beam pairing, a UE may be required to use a reserved Rx UE ID when transmitting in the special slot structure. This is because the Tx UE may not be aware of the IDs of its neighbors in the initial beam pairing phase.

In the PSSCH, multiple reference signals may be sent that are associated with different beam indexes. Similar to the discussion above, since there is no one-to-one correspondence between the beam index and the slot index, an NR UE may indicate the beam indexes that are being swept either by using the 1st or 2nd stage SCI or by sending a MAC CE in the PSSCH. The special slot may also include PSFCH so that the Rx UE may provide the selected beam index and indicate its readiness to receive the future reservation. Different UEs may use different offsets similar to the discussion above to avoid conflicts. For example, a UE may apply either a hash function or a modular operation on its PHY ID to obtain a member ID and accordingly identify the PSFCH resources that it may use for feedback. In addition, to increase the number of available sequences for feedback, an ACK only approach may be considered in this case. However, a significant difference in case of the special slots is that each UE should be assigned a subset of the PSFCH resources rather than a single resource. This is because, unlike the alternate approach described above, several beam indexes are swept within one slot and thus the UE should feed back the best index to the Tx UE. To achieve this, the number of available PSFCH resources that are associated with the PSCCH/PSSCH transmission may be divided into subsets whereby the cardinality of the subset is either (i) equal to the (pre)-configured number of beam indexes that may be swept within one slot when the PSFCH exists in every slot or (ii) the product of (a) the total number of beam indexes that may be swept by one slot and (b) the PSFCH periodicity. Subsequently, based on its UE ID, a UE may identify a subset of resources to use for the feedback to the Tx UE. Finally, it may be noted that a UE may multiplex the beam sweeping reference signals with data in order to reduce latency. In this case, one of the following two approaches may be considered:

- A comb structure whereby the data and the reference signals are sent simultaneously on the same OFDM symbol. This is applicable in cases wherein a UE is equipped with multiple antenna panels and is able to transmit in different directions simultaneously.
- Time multiplexing whereby the data is sent on OFDM symbols that are not used for beam sweeping by the reference signals.

Embodiment 21: To reduce latency and preserve resources, an NR UE may perform beam sweeping by using a special slot structure that allows sweeping of multiple beam indexes per slot.

Embodiment 22: The special slot structure may be sent either in a regular resource pool after applying sensing and resource reservation or in special resource pools on resources selected based on the Tx UE ID.

Embodiment 23: Since there is no one-to-one correspondence between the beam index and the slot index, the swept beam indexes in the special slot may be indicated either implicitly or explicitly in the 1st or 2nd stage SCI. Alternatively, a MAC CE that is sent in the associated PSSCH may be used to indicate the swept beam indexes.

Embodiment 24: The Rx UE may use the PSFCH to provide feedback on the best beam index.

Embodiment 25: Each UE may use its PHY ID, the Tx UE ID, and the time/frequency resources over which the special slot is transmitted to identify a set of PSFCH resources that may be used to indicate the best performing beam index.

Embodiment 26: The number of beam indexes that are swept per slot, the starting OFDM symbol for beam sweeping, and the number of OFDM symbols used to sweep each beam index may be (pre)-configured per resource pool.

Embodiment 27: The beam sweeping in the special slot structure may be multiplexed with data by either using a comb structure or by time multiplexing.

Enhancing synchronization accuracy by using the beam sweeping SSBs may be implemented as follows. In NR SL, all NR UEs rely on a single source for synchronization. However, this results in synchronization inaccuracy because not all UEs may be at equal distances from the synchronization source. In addition, unlike the Uu link, there is no timing advance feature for sidelink due to its distributed nature. This is mainly motivated by the fact that the sidelink transmissions are assumed to occur over short distances. For example, in NR Rel-16/Rel-17 SL, the assumption is that sidelink transmissions may occur over short distances and thus the synchronization errors may be negligible.

Figure 8:
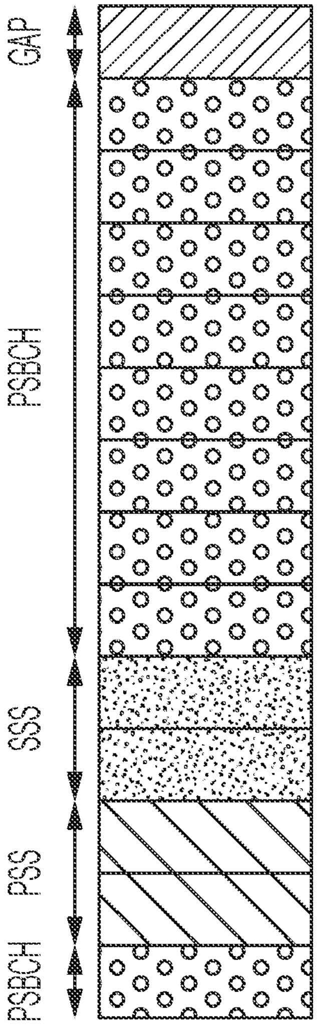
FIG. 8 is a slot allocation diagram, according to an embodiment.

To address the synchronization issues, a UE may benefit from the SSBs or the S-PSS/S-SSS transmitted in the special resource pool that are discussed above, in the context of initial beam pairing based on SSB-like or SSB transmissions in a special resource pool. For example, a UE may further adjust its timing offset when transmitting to a specific UE based on the received SSB or the S-PSS/S-SSS during the initial beam pairing. An example of the SSB is captured in FIG. 8.

For example, once a UE is able to establish a table of its neighbors, their IDs, and their locations (e.g., the beam indexes used by these UEs), it may also establish a timing advance parameter for each UE. In this case, when UE-A attempts to communicate with UE-B, it may apply its specific timing offset (e.g., timing advance) to the transmission to further improve the synchronization accuracy (the timing offset may be calculated by one UE then shared with the other UE).

The timing advance established for neighboring UEs may also be associated with a validity timer in the sense that a UE is expected to update its timing advance once a new SSB transmission is received from the target UE(s). In addition, a Tx UE may also be able to request the transmission of additional SSBs in the special resource pool from a neighboring Rx UE to further adjust the timing. This request may be indicated either by using the 1st or 2nd stage SCI or a by using a MAC CE. The triggering for this request may be either based on receiving a number of NACKs from the Rx UE or when a larger amount of data is pending for transmission to the Rx UE.

Another possibility to achieve better synchronization is that the NR Tx UE re-attempts to perform synchronization with the target Rx UE through the SSBs that are sent in the special resource pool rather than relying on a different synchronization source and then performing adjustments. For example, by using the target Rx UE ID, it may identify the resources that may be used by the target UE when transmitting its SSBs in the special resource pool. Subsequently, it may detect the SSBs sent by the Rx UE, and use the S-PSS and S-SSS for synchronization whereas the PSBCH payload may be used for obtaining the frame/slot timing as well as the SSB index (which may be identified by a combination of DMRS sequences and PSBCH content bits). In this case, the synchronization and beam sweeping may be performed between Tx and Rx UE in a self-contained way without a need for any additional neighboring UE acting as a synchronization reference (syncref) UE.

Embodiment 28: NR UEs may improve their synchronization accuracy by relying on the SSB transmissions that are sent for initial beam pairing.

Embodiment 29: An NR UE may apply a timing offset (e.g., a timing advance) when transmitting to a specific UE based on the received SSB or the S-PSS/S-SSS that are sent for initial beam pairing.

Embodiment 30: A validity timer may be associated with the synchronization adjustments that are calculated based on the SSBs sent in the special resource pool.

Embodiment 31: An NR UE may use the 1st or 2nd stage SCI or a MAC CE to request the transmission of additional SSBs in the special resource pool for timing adjustments.

Figure 9:
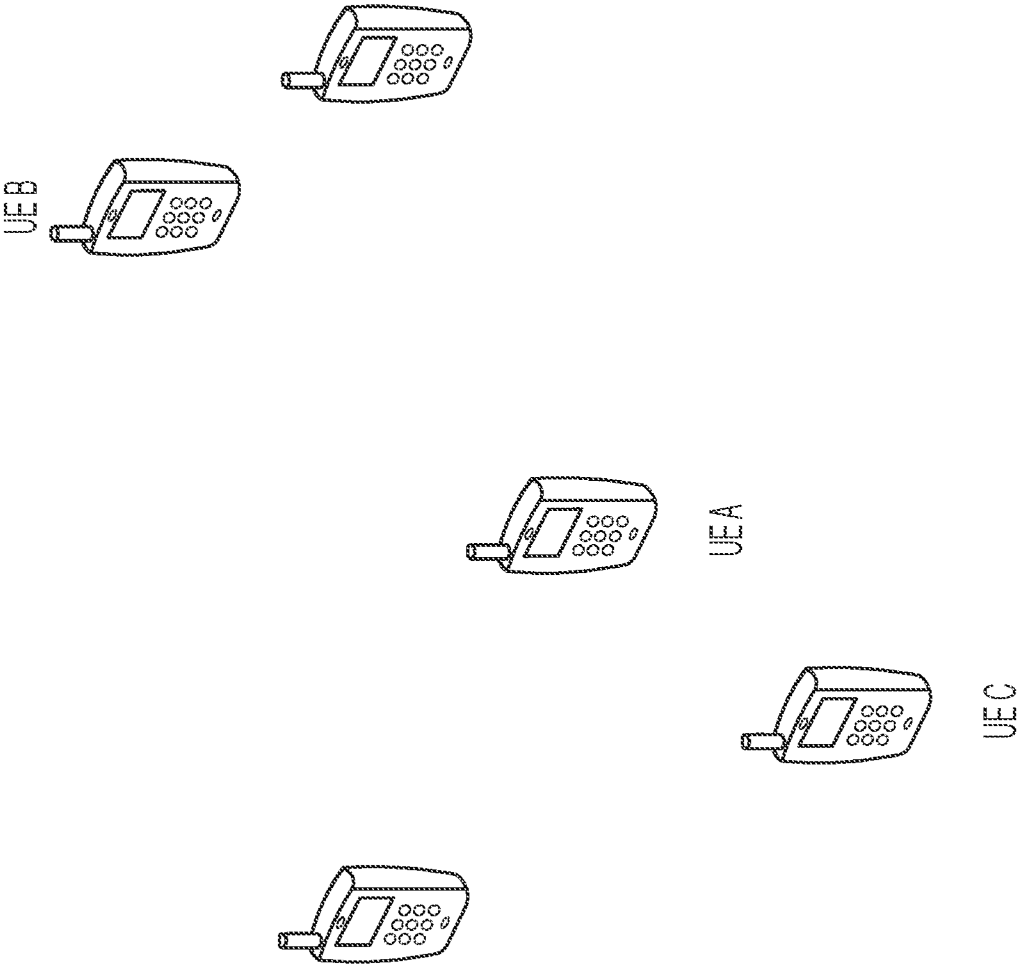
FIG. 9 is a schematic drawing of distributed UEs, according to an embodiment.

Conflict in future reservations due to directivity may be handled as follows. In NR Rel-17, two resource selection assistance schemes were developed to improve the performance of NR Rel-16. In these schemes the assisting UE is assumed to provide guidance to the assisted UE either in the form of preferred/non-preferred resources for resource selection through Scheme 1 or an indication of a potential conflict so that the assisting UE may perform resource reselection through Scheme 2. The following assumes that two UEs (e.g., UE-B and UE-C) are attempting to communicate with UE-A in a slot X but on different subchannels as shown in FIG. 9.

In this case, if UE-A is not capable of receiving from multiple directions simultaneously, UE-A may be able to receive from either UE-B or UE-C but not both due to directivity since UE-A may need to point its Rx beam towards either UE-B or UE-C. To address this drawback, one possibility is that UE-A uses Scheme 2 of NR Rel-17 to indicate a potential conflict and request a resource reselection from either UE-B or UE-C based on priority. For example, this may be done by one of the following:

UE-A may apply a different offset to the PSFCH resource selected for conflict indication.

The triggering conditions for Scheme 2 conflict indication may be updated to include the potential conflict indication due to directivity. In such a case, the same offset (e.g., cyclic shift 0) may be used in a manner similar to that of NR Rel-17.

The selection of the neighboring UE to perform the resource reselection may follow the same rules as those of Scheme 2 in Rel-17. For example, the NR UE that indicated that it is capable of receiving Scheme 2 indication and has lower priority may be requested to perform resource reselection.

Another possibility is that the assisting UE considers the directivity constraint when selecting the preferred/non-preferred resources of Scheme 1. For example, if a UE is expected to receive in a slot X from a UE in a specific direction, then it may include the remaining subchannels within this slot as non-preferred when receiving from other UEs when they are in different directions. To reduce the resource selection complexity, the assisting UE may treat the directivity constraint as being similar to the half-duplex constraint. For example, if the assisting UE is expected to receive in slot X, then it may consider that all the subchannels within slot X are non-preferred irrespective of the assisted UE location.

Embodiment 32: An NR UE that is expected to receive from multiple NR UEs in an upcoming slot may use the PSFCH to request a resource reselection from a neighboring UE if it cannot direct its Rx beam towards all the Tx UEs simultaneously.

Embodiment 33: The resource reselection indication may be done by either applying an offset on a PSFCH resource or by using the same offset while including the directivity constraint to the triggers for Scheme 2.

Embodiment 34: An NR assisting UE should consider the directivity constraint when selecting the preferred/non-preferred resources of Scheme 1 (e.g., it may exclude the subchannels within a slot in which it cannot receive from the assisted UE due to directivity).

Figure 10:
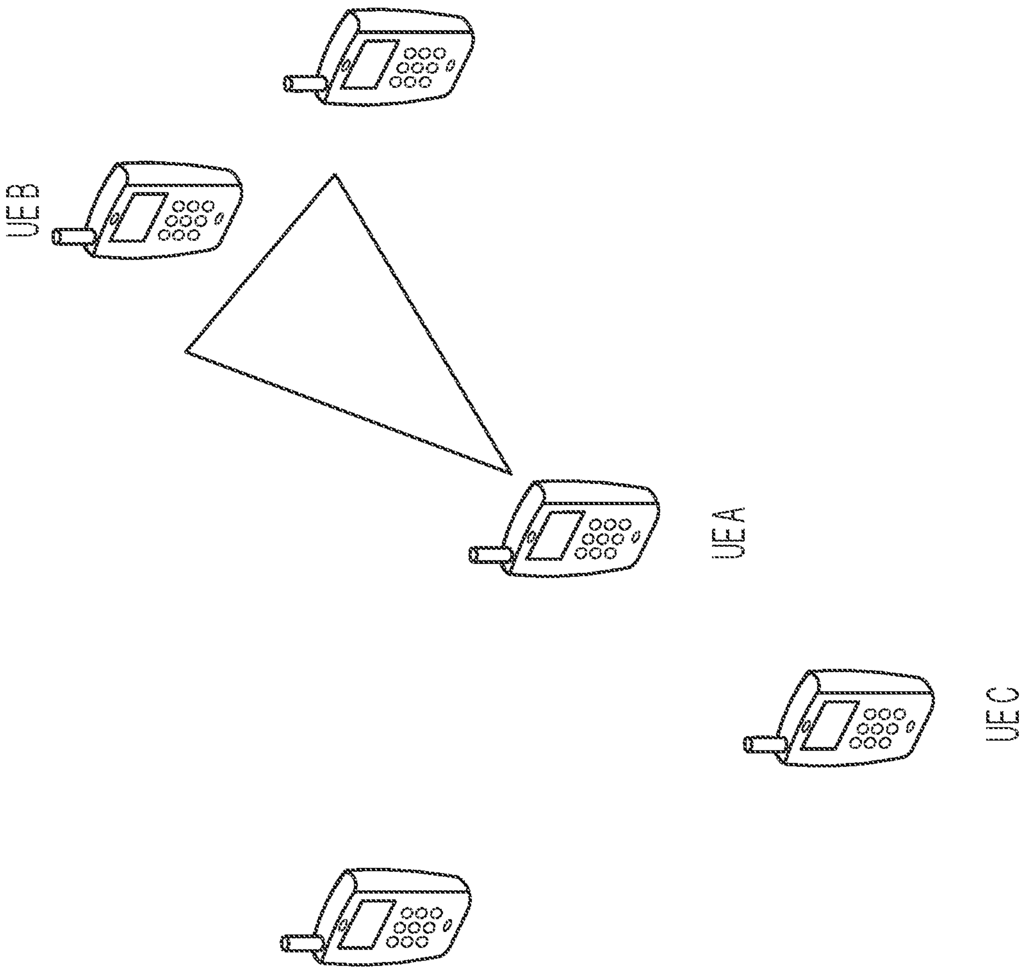
FIG. 10 is a schematic drawing of distributed UEs, according to an embodiment.

Using the half-duplex constraint to resolve the impact of directivity constraint on sensing may be implemented as follows. In NR Rel-18, beamforming is considered advantageous for realizing the gains of FR2. However, the directivity may have a significant impact on the sensing performance. For example, in FIG. 10, in which UE-A is attempting to receive from UE-B, UE-A may need to direct its beam towards UE-B and thus may not be able to receive any reservations from neighboring UEs (e.g., UE-C) if it does not have multiple antenna panels. Subsequently, if UE-A misses the reservations made by UE-C then it may collide with its future resource reservations.

Figure 11:
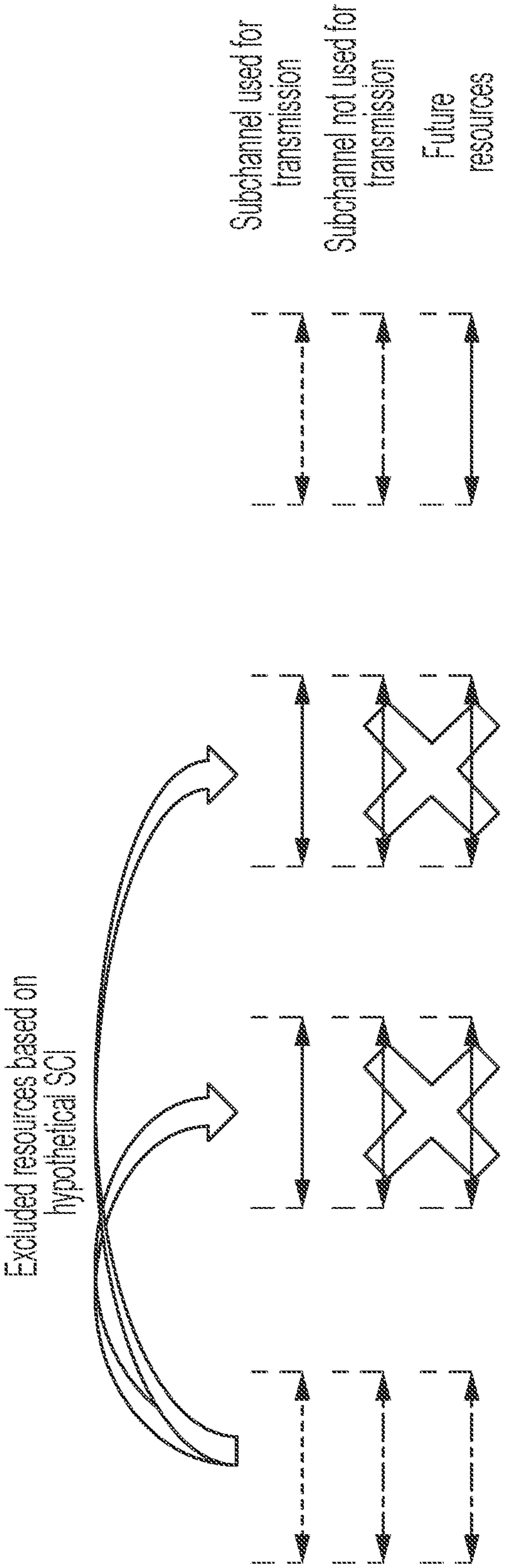
FIG. 11 is a diagram illustrating exclusion of subchannels, according to an embodiment.

To address this drawback, UE-A may apply a constraint similar to that of the half-duplex constraint of NR Rel-16. For example, for the slot in which UE-A was receiving from UE-B, it may assume that a hypothetical SCI was received from neighboring UEs and accordingly exclude resources based on either all the possible configured periods or a subset of these periods to avoid over exclusion. For example, if UE-A received from UE-B in slot X and the configured periods of the resource pool are 20 and 50 then it may assume the presence of a hypothetical SCI and exclude slots X+20 and X+50 from its resource selection window. This exclusion may also be limited to the zones/angles in which UE-B does not fall. For example, if UE-B falls in zone X then a UE may not apply the exclusion if it attempts to transmit to UE-B or any other UE within the same zone. Similarly, the exclusion may not be applied if a UE attempts to use a resource and transmit in the direction of UE-B. In addition, to reduce the impact of over exclusion, a UE may assume that the hypothetical SCI applies only to the subchannels that were not used by UE-B for transmission as shown in FIG. 11.

In other words, UE-A may exclude only the subchannels that were not occupied by UE-B in the future slots identified by the hypothetical SCI. For example, if three subchannels exist and subchannel 2 was used by UE-B for transmitting and the possible periods were 20 and 30 slots and the slot in which the reception occurred in was slot X, then a UE may exclude only subchannels 1 and 3 in slots X+20 and X+30 based on the hypothetical SCI concept.

Embodiment 35: A UE with limited reception capability due to directivity may employ an approach similar to the half-duplex constraint of Rel-16 (e.g., assume the presence of a hypothetical SCI and exclude future resources based on either all or a subset of the configured periods).

Embodiment 36: To avoid the over exclusion of resources, a UE may assume the presence of the hypothetical SCI due to directivity if its future transmission that triggered the resource selection is in a direction different from that which was used for sensing. Alternatively, the hypothetical SCI may be considered only if the target Rx UE of the future transmission is in a zone different from that of the Tx UE that triggered the directivity constraint.

Embodiment 37: to further avoid the over exclusion of resources, the hypothetical SCI may be assumed to apply only on a subset of the subchannels that were not used by the neighboring UE that triggered the directivity constraint.

Maintaining beam sweeping transmissions after initial link establishment may be implemented as follows. As discussed above, beam sweeping may be employed for initial beam pairing and discovery of neighboring UEs for potential transmissions. However, maintaining these periodic transmissions after link establishment may incur significant overhead. This issue is magnified in cases in which the periodicity of the beam sweeping is very low. To reduce the overhead, the following aspects may be considered:

There may be two-phases for beam sweeping transmissions. For example, when a UE has data to transmit but is not currently engaged in communication with the Rx UE (e.g., it needs to perform initial beam pairing), it may attempt to transmit the beam sweeping transmissions frequently (e.g., with a shorter period). Subsequently, after establishing the link with the Rx UE(s), the NR UE may switch to longer periodicity for SSB transmissions after link establishment to reduce the overhead.

A UE may skip the sweeping of beam indices that were used for communication within a given window. For example, if a UE performed a sidelink transmission using beam index X within a given time duration, then it may skip this direction in the beam sweeping. This is helpful in reducing the power consumption as well as persevering resources thus reducing the chances of collisions. In case of one-to-one mapping between the beam index and the resource used to send the SSB, the resource may be skipped and not used for transmitting a beam in a different direction.

Embodiment 38: Two phases may be configured for beam sweeping to reduce the signaling overhead (e.g., one with shorter periodicity for initial beam sweeping and another with longer periodicity after link establishment to help with link maintenance).

Embodiment 39: To reduce power consumption and preserve resources, when performing beam sweeping, an NR UE may skip the transmissions of beam indexes that were recently used for a previous transmission within a given validity timer.

Sensing for Mode 2 resource selection with directivity may be implemented as follows. In Mode 2 resource selection, sensing plays a role in identifying the resources reserved by neighboring UEs and accordingly avoiding them. However, due to directivity, performing adequate sensing may not be possible. This is because, at any given slot, an NR UE may not be able to select the direction to which it should direct its beam since it is not aware of the neighboring UEs that may also be performing transmissions. For example, if a neighboring NR UE decides to send an aperiodic transmission, then the Rx UE may not be pointing its Rx beam towards the Tx UE.

One possibility is to rely only on Tx beam forming when the UE is not aware of any of its neighboring reservations. For example, an NR UE may rely on omni-directional reception of neighboring UEs reservations to identify their potential resource reservations. Subsequently, it may apply the Rx beam forming only for future reservations (both aperiodic and periodic future reservations) once it becomes aware of the presence and direction of transmission of a neighboring UE.

Figure 12:
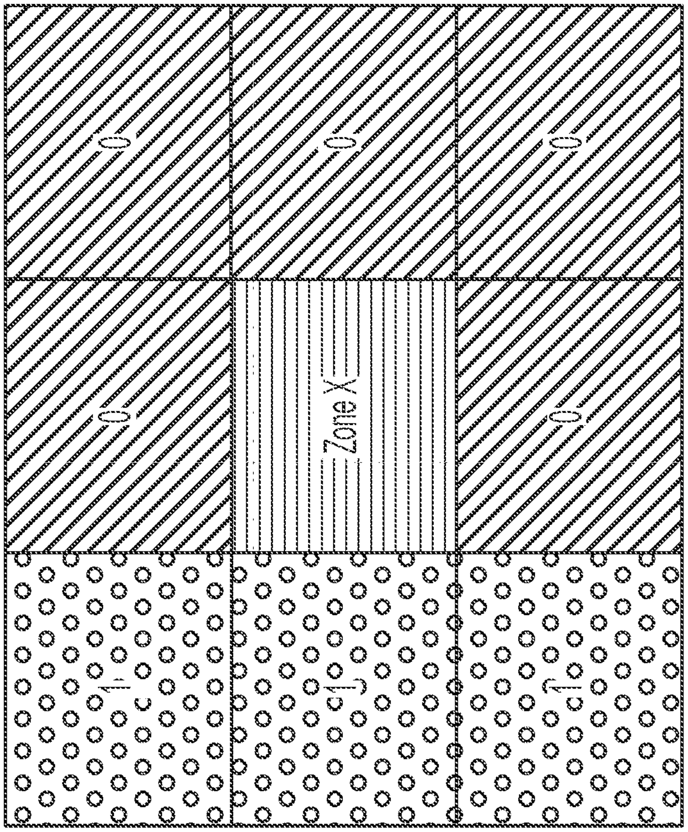
FIG. 12 is a diagram of zones surrounding a UE, according to an embodiment.

Another possibility is to rely on an approach similar to that of Discontinuous Reception (DRX) in Rel-17 sidelink rather than the omni-directional reception when it is not aware of its neighboring reservations (e.g., a beam specific DRX approach). For example, NR UEs may exchange their sensing patterns with their neighbors. In this case, if the sensing pattern of the Rx UE in a given slot is pointing towards a direction that is opposite from the Tx UE (e.g., not covering the direction of the Tx UE), then the Rx UE may be considered in a DRX off state. Subsequently, a Tx UE should avoid transmitting in slots wherein the Rx UE is not pointing in the right direction. For example, an NR UE may share with its neighbors its sensing pattern in which it indicates one or more of the following fields:

- The UE's location (exact or zone).
- The beamwidth used for receiving if not pre-configured per resource pool.
- The active beam index pattern (e.g., 1st beam, 3rd beam, 2nd beam, etc.). Multiple beams may be active simultaneously if a UE is capable of doing so.
- The validity timer for the Rx pattern.
- To reduce the complexity and overhead in exchanging and processing the active beam index pattern of the Rx UE, the pattern may consist of zones rather than beam indexes. For example, instead of sharing its active beam index pattern and its location, an NR UE may send its location and the neighboring zones that it may be receiving from at any given slot. For example, a UE may indicate its current zone and then provide a bitmap indicating which of the neighboring zones it is expecting to receive from at any given slot. For example, a UE may indicate that its current zone is X and then use an 8-bit bitmap to indicate which of the surrounding zones it is expecting to receive from. For example setting a bit equal to 1 may indicate that the UE may receive from the corresponding zone as shown in FIG. 12.

In cases in which the beam index pattern is invalid or not available, the NR UE may take any of the following three actions:

- Elect to transmit (e.g., transmit with higher repetitions to increase the chances of reaching the target Rx UE).
- Transmit a request for an updated pattern using the 1st or 2nd stage SCI or MAC CE.
- Follow an initial beam pairing procedure to identify the presence of the neighboring UE and its sensing pattern.

Figure 13:
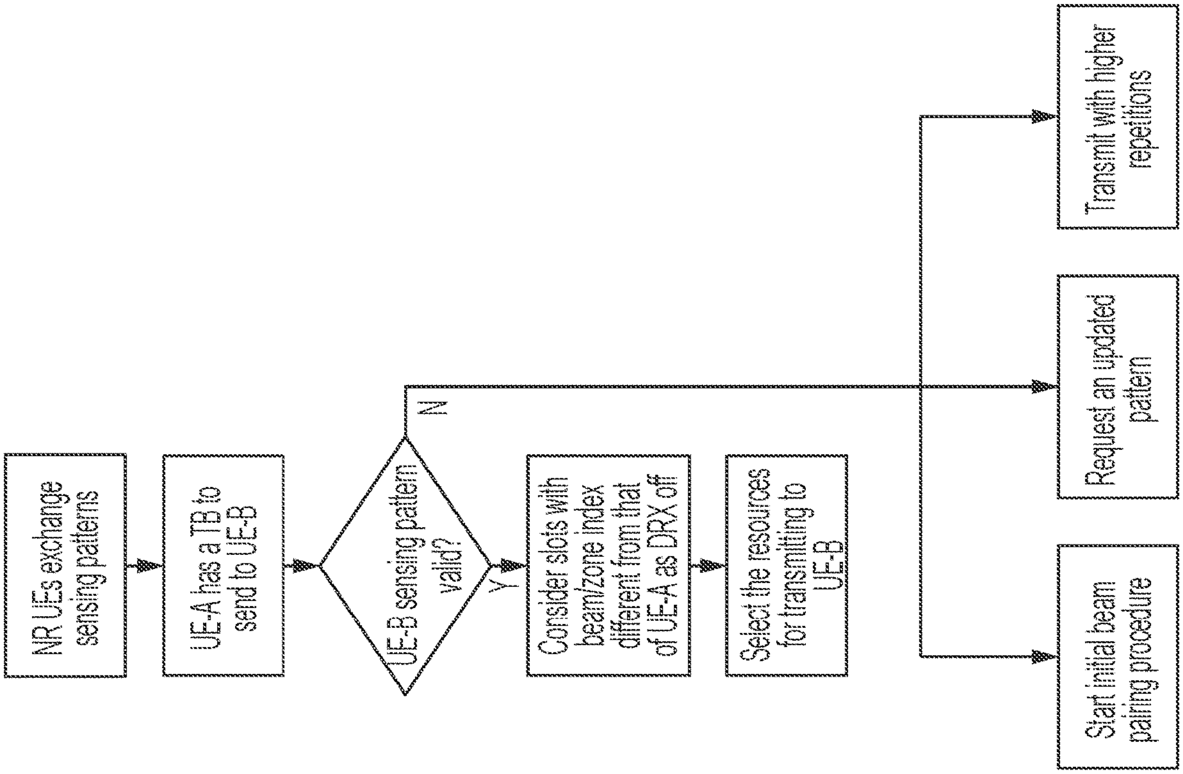
FIG. 13 is a flow chart, according to an embodiment.

The above sensing procedure is described by the flowchart of FIG. 13. The active beam index pattern may be dynamic. In other words, the pattern may be adjusted based on future reservations by neighboring UEs to ensure that the NR UE may receive from these UEs. In this case, the NR UE may do any of the following:

- Send an updated pattern if it expects that it may not be able to receive from the Tx UE in a reserved future reservation.
- Send resource selection assistance to guide neighboring UEs in selecting suitable resources or avoiding conflicting resources based on the updated pattern (e.g., by using Rel-17 resource selection assistance Schemes 1 and 2 as discussed above, in the context of conflict in future reservations due to directivity).

Embodiment 40: An NR UE may attempt to receive the first transmission in an omni-directional fashion and use Rx beam forming only for future periodic/aperiodic reservations.

Embodiment 41: An NR UE may exchange the sensing pattern with its neighboring UEs. Accordingly, the NR UE may be considered either as in DRX on or DRX off based on whether its Rx beam is directed towards the Tx UE or not.

Embodiment 42: To reduce the complexity, the sensing pattern may be exchanged based on the zones the Rx UE expects to receive from at a given slot rather than sending its active beam index(es) for the slot.

Embodiment 43: If an Rx UE updates its sensing pattern based on one or more future reservation by neighboring UEs, it may either send an updated pattern to its neighbors or use the resource selection assistance schemes of Rel-17 to guide neighboring UEs in transmitting in the slots in which it may receive.

Figure 14:
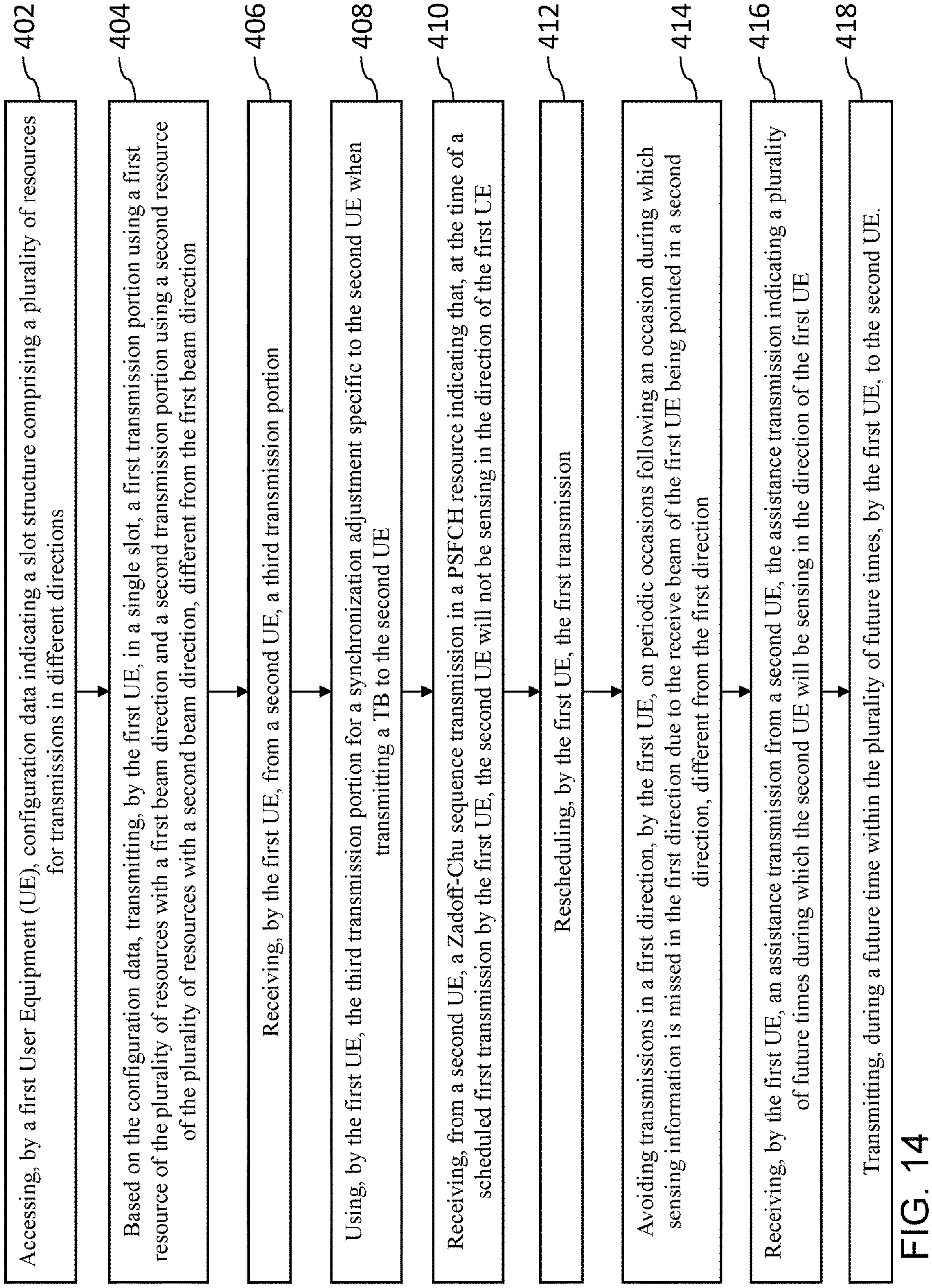
FIG. 14 is a flowchart of a method, according to an embodiment.

FIG. 14 is a flow chart of a method, in some embodiments. The method includes accessing, at 402, by a first User Equipment (UE), configuration data indicating a slot structure including a plurality of resources for transmissions in different directions; based on the configuration data, transmitting, at 404, by the first UE, in a single slot, a first transmission portion using a first resource of the plurality of resources with a first beam direction and a second transmission portion using a second resource of the plurality of resources with a second beam direction, different from the first beam direction; receiving, at 406, by the first UE, from a second UE, a third transmission portion; and using, at 408, by the first UE, the third transmission portion for a synchronization adjustment specific to the second UE when transmitting a Transport Block (TB) to the second UE; receiving, at 410, from a second UE, a Zadoff-Chu sequence transmission in a Physical Sidelink Feedback Channel (PSFCH) resource indicating that, at the time of a scheduled first transmission by the first UE, the second UE will not be sensing in the direction of the first UE; rescheduling, at 412, by the first UE, the first transmission; avoiding, at 414, transmissions in a first direction, by the first UE, on periodic occasions following an occasion during which sensing information is missed in the first direction due to the receive beam of the first UE being pointed in a second direction, different from the first direction; receiving, at 416, by the first UE, an assistance transmission from a second UE, the assistance transmission indicating a plurality of future times during which the second UE will be sensing in the direction of the first UE; and transmitting, at 418, during a future time within the plurality of future times, by the first UE, to the second UE.

Figure 15:
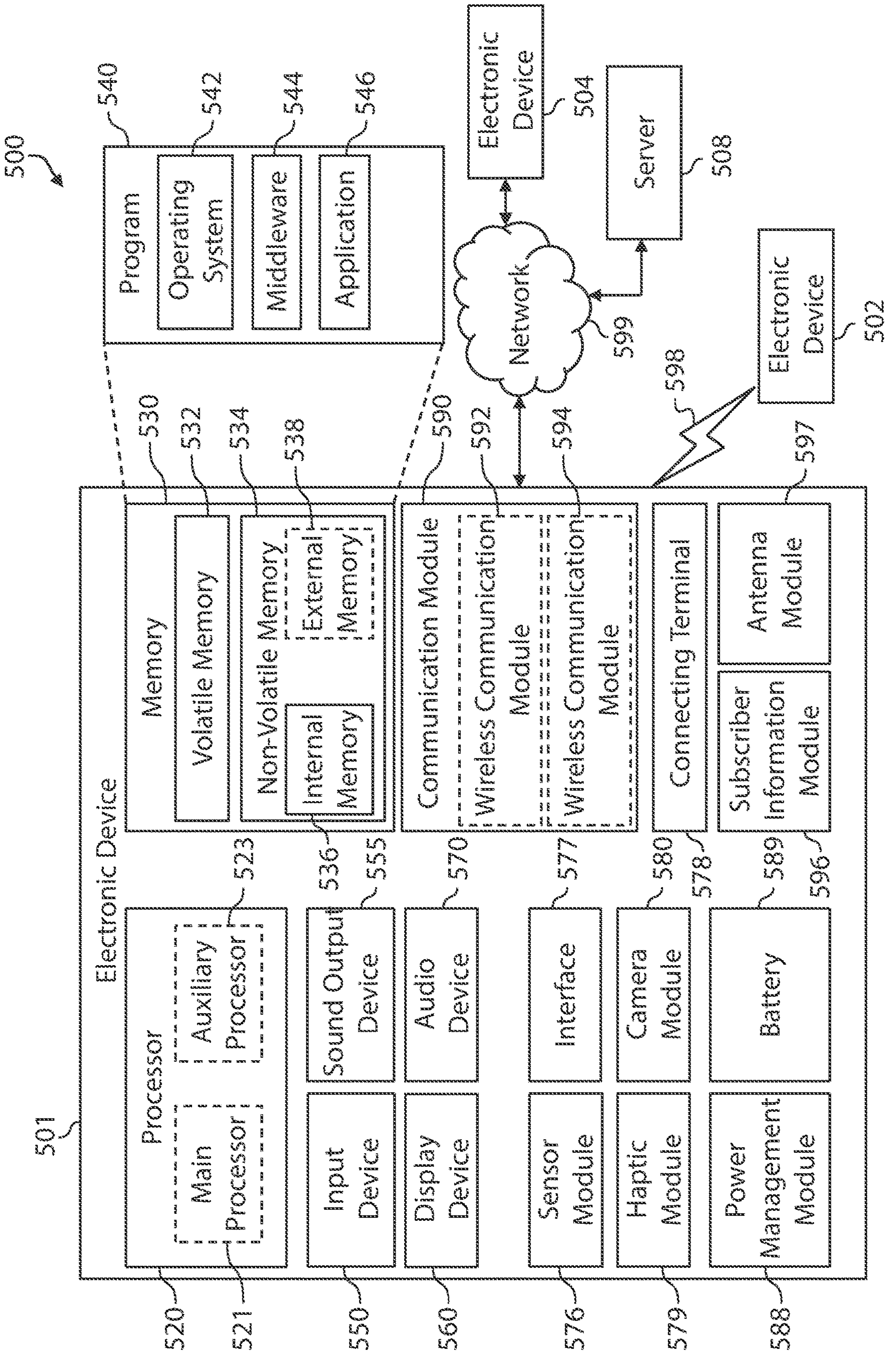
FIG. 15 is a block diagram of an electronic device in a network environment, according to an embodiment.

FIG. 15 is a block diagram of an electronic device 501 (e.g., a UE) in a network environment 500, according to an embodiment. The electronic device (or UE) 501 may perform, or be configured to perform, some or all of the methods disclosed herein.

Referring to FIG. 15, an electronic device 501 in a network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor (or "means for processing") 520, a memory 530, an input device 540, a sound output device 555, a display device 560, an audio module 570, a sensor module 576, an interface 577, a haptic module 579, a camera module 580, a power management module 588, a battery 589, a communication module 590, a subscriber identification module (SIM) card 596, or an antenna module 594. In one embodiment, at least one (e.g., the display device 560 or the camera module 580) of the components may be omitted from the electronic device 501, or one or more other components may be added to the electronic device 501. Some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute software (e.g., a program 540) to control at least one other component (e.g., a hardware or a software component) of the electronic device 501 coupled with the processor 520 and may perform various data processing or computations.

As at least part of the data processing or computations, the processor 520 may load a command or data received from another component (e.g., the sensor module 546 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). The auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. The display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. The audio module 570 may obtain the sound via the input device 550 or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. The interface 577 may include, for example, a high-definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. The connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. The haptic module 579 may include, for example, a motor, a piezoelectric element, or an electrical stimulator.

The camera module 580 may capture a still image or moving images. The camera module 580 may include one or more lenses, image sensors, image signal processors, or flashes. The power management module 588 may manage power supplied to the electronic device 501. The power management module 588 may be implemented as at least part of, for example, a power management integrated circuit (PMIC).

The battery 589 may supply power to at least one component of the electronic device 501. The battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. The communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile sub scriber identity (IMSI)) stored in the sub scriber identification module 596.

The antenna module 597 may transmit or receive a signal or power to or from the outside (e.g., the external electronic device) of the electronic device 501. The antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

Commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

A "transmission" as used herein refers to a contiguous set of symbols transmitted by a gNB or by a UE. Some examples of a "transmission" are an SSB, a set of symbols as illustrated in FIG. 5, or a set of symbols as illustrated in FIG. 7. A "transmission portion" as used herein, is a portion of a transmission (which may be an entire transmission or less than an entire transmission). Some examples of a "transmission portion" are a DMRS within the transmission illustrated in FIG. 5, or a reference signal within the transmission of FIG. 7 or the transmission of a SPSS or SSSS. An "SSB-like" transmission as used herein refers to a transmission that includes some, of the attributes of an SSB. For example, any transmission that includes at least one of the following may be considered an "SSB-like" transmission: a PSS, an SSS, a PSBCH. The transmission illustrated in FIG. 5 may be another example of an "SSB-like" transmission.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method, comprising:

accessing, by a first User Equipment (UE), configuration data indicating a slot structure comprising a plurality of resources for transmissions in different directions; and based on the configuration data, transmitting, by the first UE, in a single slot configured using the indicated slot structure, a first transmission portion using a first resource of the plurality of resources with a first beam direction and a second transmission portion using a second resource of the plurality of resources with a second beam direction, different from the first beam direction, wherein the indicated slot structure of the single slot is configured using a number of beams swept within the single slot, a starting symbol for beam sweeping, and a number of symbols used corresponding to the first beam and the second beam.

2. The method of claim 1, wherein the first transmission portion is a portion of a Synchronization Signal Block (SSB), and the second transmission portion is a portion of a same SSB.

3. The method of claim 1, wherein the first transmission portion is a portion of a Synchronization Signal Block-like (SSB-like) transmission, and the second transmission portion is a portion of a same SSB-like transmission.

4. The method of claim 1, wherein the first transmission portion is transmitted in resources from a resource pool that is (pre)-configured by Radio Resource Control (RRC), the resource pool being separate from resources used for synchronization.

5. The method of claim 1, wherein the first transmission portion comprises a Physical Sidelink Broadcast Channel (PSBCH) comprising a UE identifier of the first UE or a beam identifier of the first transmission portion.

6. The method of claim 1, wherein the first transmission portion comprises a Sidelink Primary Synchronization Signal (SPSS), a Sidelink Secondary Synchronization Signal (SSSS), and a Demodulation Reference Signal (DMRS), the SSSS and the DMRS having different beam directions.

7. The method of claim 6, wherein the first transmission portion comprises a sequence selected based on a UE identifier of the first UE.

8. The method of claim 1, wherein the transmitting, by the first UE, of the first transmission portion comprises transmitting the first transmission portion in a resource selected based:

on a hash function of a UE identifier of the first UE, or on a pseudorandom number, or on a priority of a Transport Block (TB), that triggered the transmitting of the first transmission portion, or on sensing information.

9. The method of claim 1, wherein the transmitting, by the first UE, of the first transmission portion comprises transmitting the first transmission portion in a slot selected based on sensed availability of resources in a previous slot.

10. The method of claim 1, wherein:

a Physical Sidelink Shared Channel (PSSCH) comprises the first transmission portion and the second transmission portion;

the first transmission portion comprises a first reference signal; and the second transmission portion comprises a second reference signal.

11. The method of claim 1, further comprising:

receiving, by the first UE, from a second UE, a third transmission portion; and using, by the first UE, the third transmission portion for a synchronization adjustment specific to the second UE when transmitting a Transport Block (TB) to the second UE.

12. The method of claim 1, wherein:

the first transmission portion comprises a reference signal and control information, and the second transmission portion comprises a reference signal and control information.

13. The method of claim 1, further comprising:

receiving, from a second UE, a Zadoff-Chu sequence transmission in a Physical Sidelink Feedback Channel (PSFCH) resource indicating that, at the time of a scheduled first transmission by the first UE, the second UE will not be sensing in the direction of the first UE; and rescheduling, by the first UE, the first transmission.

14. The method of claim 1, further comprising:

avoiding transmissions in a first direction, by the first UE, on periodic occasions following an occasion during which sensing information is missed in the first direction due to the receive beam of the first UE being pointed in a second direction, different from the first direction.

15. The method of claim 1, further comprising:

receiving, by the first UE, an assistance transmission from a second UE, the assistance transmission indicating a plurality of future times during which the second UE will be sensing in the direction of the first UE; and transmitting, during a future time within the plurality of future times, by the first UE, to the second UE.

16. A User Equipment (UE), comprising:

one or more processors; and a memory storing instructions which, when executed by the one or more processors, cause performance of:

accessing, by the UE, configuration data indicating a slot structure comprising a plurality of resources for transmissions in different directions; and based on the configuration data, transmitting, by the UE, in a single slot configured using the indicated slot structure, a first transmission portion using a first resource of the plurality of resources with a first beam direction and a second transmission portion using a second resource of the plurality of resources with a second beam direction, different from the first beam direction, wherein the indicated slot structure of the single slot is configured using a number of beams swept within the single slot, a starting symbol for beam sweeping, and a number of symbols used corresponding to the first beam and the second beam.

17. The UE of claim 16, wherein the first transmission portion is a portion of a Synchronization Signal Block (SSB), and the second transmission portion is a portion of a same SSB.

18. The UE of claim 16, wherein the first transmission portion is a portion of a Synchronization Signal Block-like (SSB-like) transmission, and the second transmission portion is a portion of a same SSB-like transmission.

19. The UE of claim 16, wherein the first transmission portion is transmitted in resources from a resource pool that is (pre)-configured by Radio Resource Control (RRC), the resource pool being separate from resources used for synchronization.

20. A User Equipment (UE), comprising:

means for processing; and a memory storing instructions which, when executed by the means for processing, cause performance of:

accessing, by the UE, configuration data indicating a slot structure comprising a plurality of resources for transmissions in different directions; and based on the configuration data, transmitting, by the UE, in a single slot configured using the indicated slot structure, a first transmission portion using a first resource of the plurality of resources with a first beam direction and a second transmission portion using a second resource of the plurality of resources with a second beam direction, different from the first beam direction, wherein the indicated slot structure of the single slot is configured using a number of beams swept within the single slot, a starting symbol for beam sweeping, and a number of symbols used corresponding to the first beam and the second beam.

* * * * *